(12) United States Patent
Shveidel et al.

(10) Patent No.: US 12,393,516 B2
(45) Date of Patent: Aug. 19, 2025

(54) EFFICIENT DEDUPLICATION IN A METADATA DELTA LOG ARCHITECTURE

(71) Applicant: Dell Products L.P., Hopkinton, MA (US)

(72) Inventors: Vladimir Shveidel, Pardes-Hana (IL); Socheavy D. Heng, Framingham, MA (US); Jonathan Volij, Meitar (IL)

(73) Assignee: Dell Products L.P., Hopkinton, MA (US)

( * ) Notice: Subject to any disclaimer, the term of this patent is extended or adjusted under 35 U.S.C. 154(b) by 13 days.

(21) Appl. No.: 18/417,463

(22) Filed: Jan. 19, 2024

(65) Prior Publication Data

US 2025/0238372 A1    Jul. 24, 2025

(51) Int. Cl.
*G06F 12/0804* (2016.01)
*G06F 12/0811* (2016.01)
*G06F 12/1009* (2016.01)

(52) U.S. Cl.
CPC ...... *G06F 12/0804* (2013.01); *G06F 12/0811* (2013.01); *G06F 12/1009* (2013.01)

(58) Field of Classification Search
CPC ............. G06F 12/0804; G06F 12/0811; G06F 12/1009
See application file for complete search history.

(56) References Cited

U.S. PATENT DOCUMENTS

| 11,886,427 | B1* | 1/2024 | Shveidel | G06F 16/2379 |
| 2006/0195482 | A1* | 8/2006 | Stokkan | G06N 5/02 |
| 2007/0233683 | A1* | 10/2007 | Verma | G06F 16/22 |
| 2020/0241793 | A1* | 7/2020 | Shveidel | G06F 3/0604 |
| 2020/0341907 | A1* | 10/2020 | Shveidel | G06F 3/0604 |
| 2023/0026819 | A1* | 1/2023 | Love | G06F 12/0804 |

OTHER PUBLICATIONS

U.S. Appl. No. 16/260,660, filed Jan. 29, 2019, entitled System and Method for Aggregating Metadata Changes in a Storage System, Vladimir Shveidel, et al.

* cited by examiner

*Primary Examiner* — Sean D Rossiter
(74) *Attorney, Agent, or Firm* — BainwoodHuang

(57) ABSTRACT

In at least one embodiment, destaging a write of a user data (UD) log may include: performing deduplication that determines content written by the write to a logical address LA is a duplicate of existing content; and establishing mapping information of a chain of metadata (MD) pages mapping LA to a physical address PA storing the existing content, wherein the chain includes a MD leaf page and a VLB (virtual layer block) page. An update of a MD log can update an indirect pointer (IDP) field of a MD leaf entry of the MID leaf page to reference a VLB entry of the VLB page where the VLB entry further includes PA. A second update of the MD log can increment a reference count of the VLB entry. The second update can be recorded blindly in the MD log without reading or accessing the reference count during destaging the write.

17 Claims, 19 Drawing Sheets

Incref delta 902

LI 902a: logical index of the VLB page

EI 902b: entry index denoting a particular entry, offset or location in the VLB page denoted by LI, (e.g., EI identifies the VLB page entry that includes the relevant ref count)

T 902c: type of metadata update is INCREF

IDP delta 920 (e.g., update to IDP of MD leaf entry, where IDP indirectly references a physical storage location of content stored on non-volatile storage).

LI 920a: logical index of the MD leaf page

EI 920b: entry index denoting a particular entry, offset or location in the MD leaf page denoted by LI, (e.g., EI identifies the MD leaf page entry that includes the relevant IDP field)

T 920c: type of metadata update is IDP denoting an update to an address or indirect pointer used to reference a data block (e.g., the indirect pointer may be point to, or be the address of, a VLB entry that further includes an address of, or pointer to, the data block containing user data or content stored on non-volatile storage)

V 920d: value or address of VLB entry to be stored as the IDP field of the MD leaf entry identified by LI 920a and EI 920b

Extended Incref delta 904

LI 904a: logical index of the VLB page

EI 904b: entry index denoting a particular entry, offset or location in the VLB page denoted by LI, (e.g., EI identifies the VLB page entry that includes the relevant ref count)

T 904c: type of metadata update is EXTINCREF back reference 904d : back reference or back pointer to a MD leaf entry IDP tuple redirection flag 904e: denotes whether redirection resolution is needed for the IDP of the MD leaf entry corresponding to the back reference field 904d (e.g., whether redirection resolution is needed for the IDP of the MD leaf entry identified by the backreferenced MD leaf entry IDP tuple pointed to by back reference field 904d).

FIG. 9B

EFFICIENT DEDUPLICATION IN A METADATA DELTA LOG ARCHITECTURE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a write operation that writes first content to a first target logical address; recording the write operation in a user data (UD) log; destaging the write operation from the UD log including: performing deduplication processing that determines the first content written by the write operation is a duplicate of the first content as currently stored at a first physical address on non-volatile storage; and establishing mapping information of a chain of metadata (MD) pages that maps the first target logical address to the first physical address of the first content, wherein the chain of MD pages includes a MD leaf page and a VLB (virtual layer block) page, and wherein said establishing includes: recording in a MD log two corresponding updates in connection with deduplication of the first content, the two corresponding updates including a first update and a second update, wherein the first update updates an indirect pointer (IDP) field of a first MD leaf entry of the MD leaf page to reference a first VLB entry of the VLB page where the first VLB entry further includes the first physical address of the first content, and wherein the second update increments a reference count of the first VLB entry. Said recording can include recording the second update in the MD log without reading or accessing a current value of the reference count of the first VLB entry during said destaging the write operation from the UD log, where the reference count denotes a number of logical addresses that reference the first content as stored at the first physical address.

In at least one embodiment, the first update of the MD log can be an IDP tuple that identifies the first MD leaf entry, and identifies a first address or location of the first VLB entry. The second update of the MD log can be an extended increment reference count (incref) tuple that identifies the first VLB entry including the reference count, and includes a back reference to the IDP tuple denoting the first update. Destaging the write operation can include: acquiring a shared or read lock on the first VLB page and acquiring an exclusive or write lock on the MD leaf page; adding the IDP tuple to a current MD transaction; adding the extended incref tuple to the current MD transaction; and committing the current MD transaction to the MD log, wherein said committing includes transactionally storing the IDP tuple and the extended incref tuple for the write operation in the MD log. The extended incref tuple can include a redirection flag indicating whether redirection resolution is needed for the IDP field of the first MD leaf entry to determine whether a first current value of the IDP field denotes a valid address or location of the first VLB entry. Destaging the write operation can include: determining whether redirection resolution of the IDP field of the first MD leaf entry is needed; and responsive to determining redirection resolution of the IDP field of the first MD leaf entry is needed setting the redirection flag of the extended incref tuple to true, and otherwise setting the redirection flag of the extended incref tuple to false.

In at least one embodiment, processing can include performing MD log destaging of recorded updates to the first VLB page including: aggregating a first set(S) of relevant increment tuples from the MD log that increment the reference count of the first VLB entry, wherein S includes the extended incref tuple; calculating an updated value for the reference count by incrementing a current value of the reference count in accordance with a number of increments denoted by the relevant increment tuples of S; and determining whether the updated value exceeds a maximum allowable value (MAX) for the reference count. The MD log destaging of recorded updates to the first VLB page can further include: responsive to determining that the updated value does exceed MAX, performing first processing including: calculating an excess value with respect to the updated value of the reference count, wherein excess value denotes an amount by which the updated value exceeds MAX; creating a second VLB page including a second VLB entry corresponding to the first VLB entry of the first VLB page; and selecting a first number of increment tuples from S, wherein the first number equals the excess value, wherein the first number of increment tuples selected includes the extended incref tuple. The first processing can include: identifying, using the back reference of the extended incref tuple, the first MD leaf entry; and recording in the MD log a second IDP tuple that updates the IDP of the first MD leaf entry to reference or point to the second VLB entry of the second VLB.

In at least one embodiment, the first processing can include recording in the MD log a second number of increment reference tuples each incrementing a second reference count of the second VLB entry, wherein the second number equals the excess value. The second number of increment reference tuples can include one or more extended incref tuples incrementing the second reference count of the second VLB entry. The second number of increment reference tuples can include one or more non-extended incref tuples incrementing the second reference count of the second VLB entry. Each of the non-extended incref tuples may not include a back reference to a corresponding IDP tuple, and wherein each of the non-extended incref tuples may also not include a redirection flag field. The first processing can include persistently storing MAX as a value for the reference count of the first VLB entry.

In at least one embodiment, the MD log destaging of recorded updates to the first VLB page can be included in a first MD log destage cycle, and processing can include performing a second MD log destage cycle that includes destaging from the MD log the second IDP tuple and the second number of increment reference tuples. During the first MD log destage cycle, the MD log that is destaged can be a first in-memory MD log instance that is in a frozen state. During the first MD log destage cycle, a second in-memory MD log instance can be in an active state, and the second IDP tuple and the second number of increment reference tuples can be recorded in the second in-memory MD log instance during the first MD log destage cycle. During the second MD log destage cycle, the second in-memory MD log instance can be in the frozen state and the first in-memory MD log instance can be in the active state.

In at least one embodiment, the MD log destaging of recorded updates to the first VLB page can include: determining whether the redirection flag of the extended incref tuple is true; responsive to determining that the redirection flag of the extended incref tuple is true, performing second processing including: determining whether the first current value of the IDP field of the first MD leaf entry is invalid because the first VLB entry has been moved or relocated such that the first current value of the IDP field denotes an old prior address or location of the first VLB entry prior to being relocated or moved; and responsive to determining the first current value of the IDP field of the first MD leaf is invalid, updating the IDP field of the first MD leaf entry by recording in the MD log a second corresponding IDP tuple that updates IDP field of the first MD leaf entry to a current valid address or location of the first VLB entry. The second VLB entry can include either the first physical address of the first content or a second physical address of a copy of the first content as stored on non-volatile storage.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 9A and 9B are examples of tuples that can be included in a metadata (MD) log in at least one embodiment in accordance with the techniques of the present disclosure.

DETAILED DESCRIPTION OF EMBODIMENT(S)

Figure 1:
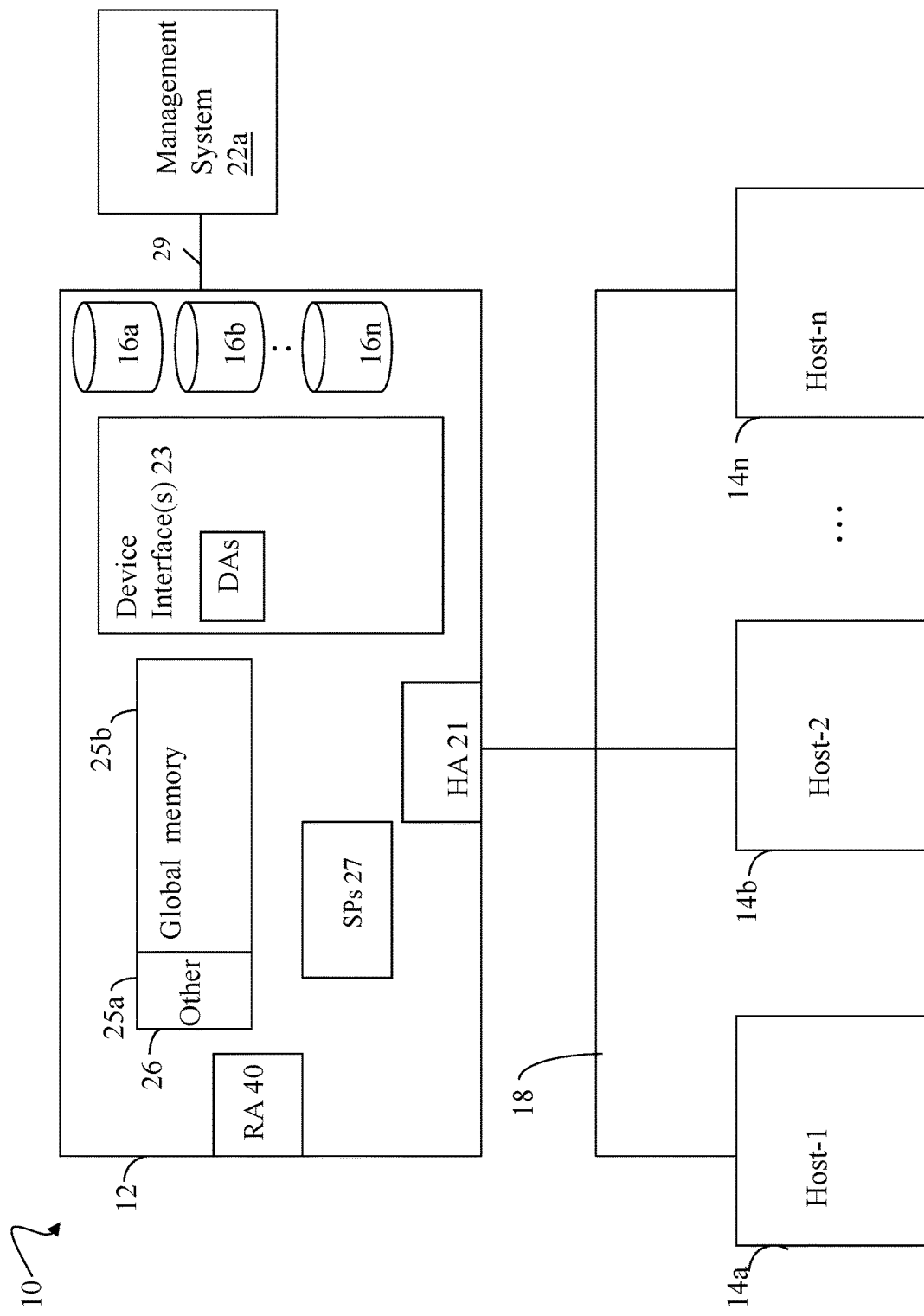
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address.

In at least one existing implementation, updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

The data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be stored persistently using in-place updates or overwrites such that processing overwrites the existing version of a MD page as stored at a physical storage location on the BE PDs with an updated version of the MD page. The physical storage location (e.g., on BE PDs) of each MD page can thus remain static or fixed so that in-place updates overwrite the same existing persistent physical storage location of the MD page.

As an alternative, the persistent or non-volatile physical storage, such as on the BE PDs, used for storing the MD pages can be maintained as a LSS in a manner similar to the LSS storing user data or content. With a LSS for MD pages, an updated MD page can be determined as a result of applying one or more entries of the metadata log which update the MD page. A current version of the MD page (before applying the updates) can be stored at an existing physical storage location on non-volatile persistent storage (e.g., on BE PDs). The updated version of the MD page can be determined and then rewritten or stored at a new physical storage location that is different from the existing physical storage location. Thus, with a LSS for metadata, the physical storage location or address of the MD page can move or change each time an updated version of the MD page is written to the BE PDs, where such updated version of the MD page can be the result of flushing one or more entries from the metadata log which update the same MD page, and then persistently storing the updated version of the MD page at the new physical storage location on the BE PDs. Persistent physical storage for a MD page can be allocated at a physical address from the BE PDs.

An overall flush rate, such as with respect to flushing the UD log, is dependent on both flush parallelism and flush processing efficiency. Degradation of the flush rate can yield undesirable adverse effects such as, for example, depleted log and/or cache resources, inefficient use of flushing processor cores and/or limited flushing scalability. Such adverse effects can, in turn, lead to limited write operation request bandwidth and overall system performance degradation.

Accordingly, the techniques of the present disclosure can be used to increase flushing efficiency and/or reduce or eliminate a flushing bottleneck that may occur when flushing write operations or requests from the UD log. In at least one embodiment, write operations or requests can include write I/Os as well as other operations or commands such as an XCOPY (extended copy) operation or command. In at least one embodiment, the XCOPY operation or command can more generally denote an offload copy operation performed internally within the storage system where the source and destination of the copy are within the same storage system or appliance.

In at least one embodiment, the techniques of the present disclosure can provide for performance improvements and increased efficiency of resources when performing data deduplication processing in connection with flushing or destaging from the UD log write I/Os and other write commands such as XCOPY commands, that generally update or modify one or more target locations such as client logical addresses storing content. In at least one embodiment, the XCOPY command includes duplicating content from a source location to a target location. Thus at least initially after performing the XCOPY command, the target location content is a complete duplicate of the source location content. In at least one embodiment, a reference count (sometimes referred to as a ref count) can be associated with each persistently stored block, chunk or other storage unit of content or data. The ref count associated with content C1 of a stored data block can denote the number of references to the stored data block such as the number of UD logical addresses that each store the same content C1.

Thus with data deduplication in at least one embodiment, flushing a recorded write I/O or XCOPY command from the UD log can include performing in-line deduplication and accordingly increasing corresponding reference counts for detected duplicate content. In at least one embodiment, an XCOPY command is therefore a case where one or more reference counts corresponding to existing stored data items of the source location are incremented as a result of the internal storage system copying of the data from the source location to the target location.

In at least one embodiment, the techniques of the present disclosure provide for improved processing associated with increment ref count operations (sometimes referred to as incref operations or increfs) such as performed in connection with data deduplication of content written by write I/Os and XCOPY commands as such commands are flushed or destaged from the UD log. In at least one embodiment, the reference count associated with an existing stored data item can be included in metadata such as an entry or field of a metadata page such as a VLB page.

In at least one embodiment, increfs performed with respect to reference counts when deduplicating data or content in connection with flushing or destaging the UD log can be performed in a manner characterized as blind. In at least one embodiment, a blind incref can be performed when flushing a write operation or request, such as a write I/O or XCOPY command from the UD log, where the MD page, such as the VLB page, including the ref count is not loaded into the cache as part of the UD log flushing workflow for the write operation. In at least one embodiment in accordance with the techniques of the present disclosure, more generally, the content of the VLB page including the ref count is not read or accessed in the UD log flushing workflow for the write operation thereby eliminating the need to cache or access the VLB page during the UD log flushing workflow for the write operation. In one implementation not using the techniques of the present disclosure, the VLB or other MD page including the ref count to be incremented can be loaded into cache and where further additional processing can be performed that includes accessing and using the existing ref count of the VLB as part of the UD log flushing workflow. In contrast, in at least one embodiment in accordance with the techniques of the present disclosure, such additional processing can be deferred until flushing or destaging of the MD log such that loading the VLB page including the ref count into cache and accessing content of the VLB page can be avoided or omitted as part of the UD log flushing workflow when performing data deduplication for data written by flushed write operations recorded in the UD log.

In at least one embodiment in accordance with the techniques of the present disclosure, the workflow when performing data deduplication for content of a flushed write operation of the UD log can include performing a blind incref by recording a MD log entry for an incref operation incrementing the ref count included in a VLB page without reading/accessing content of the VLB page and without loading the VLB page into cache from non-volatile storage. The persisted copy of the corresponding VLB page including the ref count can be read into cache, accessed and updated when the MD log entry for the recorded incref is flushed or destaged from the MD log. In at least one embodiment, at MD log destage time when processing the MD log entry of the recorded incref, such additional or other deferred processing with respect to the ref count (as deferred from the UD log flush) can be performed. In at least one embodiment, such additional or other deferred processing can include overflow detection and prevention processing to detect and avoid having the resulting incremented ref count (after performing the incref) overflow and exceed a maximum value capable of being represented by the refcount field of the VLB page. The maximum value can vary with the size or number of bits used to represent the refcount value. As a simple example, if the refcount field is 3 bits, the maximum value can be 7. Thus in at least one embodiment due to deferring the additional refcount processing and other processing from the UD log destage until the MD log destage and also performing the blind incref during UD log destage, it is unnecessary to read the existing ref count from the VLB page when performing data deduplication in connection with flushing a write operation from the UD log. Therefore in such an embodiment, loading the VLB page including the ref count into cache and generally accessing content of the VLB page can be omitted or avoided during UD log flushing when performing data deduplication for content of a flushed write operation of the UD log.

In at least one embodiment, the techniques of the present disclosure include performing blind increfs without loading the corresponding MD pages including the refcounts when performing data deduplication in connection with flushing a write of the UD log. As a result, the techniques of the present disclosure performing such blind increfs provide for efficient deduplication handling to optimize write operation or request performance. Any desired deferred processing of such ref counts, that is deferred from UD log flush or destage time, can alternatively be performed at MD log flush or destage time. In at least one embodiment, MD log destage processing can be highly scalable and expected to have a smaller less adverse impact on I/O latency in comparison to UD log flushing or destaging. In at least one embodiment, such deferred processing can include processing as described herein to avoid overflowing or exceeding the maximum value capable of being represented by a refcount field. Thus the techniques of the present disclosure in at least one embodiment include performing blind increfs without loading MD pages including corresponding ref counts into cache and without accessing such MD pages including the ref counts to provide for increased UD log flush rate and scalability without compromising, for example, storage capacity leak policies that may use accurate refcounts for proper resource reclamation and reuse such as, for example, reclamation and reuse of non-volatile storage.

In at least one embodiment, the techniques of the present disclosure can be implemented using an LSS, such as in connection with MD pages characterized by typically not performing in place updates which overwrite existing content. In the LSS for MD in at least one embodiment, flushing one or more MD log entries of updates to a MD page stored at an existing physical storage location (e.g., on BE PDs) can include determining an updated version of the MD page and storing the updated version of the MD page at a new physical storage location that is different from the existing physical storage location. More generally, the techniques of the present disclosure can also be used in embodiments that can utilize a MD log for recording MD updates but where the revised MD page may be stored "in-place" at the same existing physical storage location as the prior version of the MD page before applying the MD updates. Put another way, the techniques of the present disclosure can be performed in embodiments using the MD delta log architecture described herein in which the MD pages are stored in a log-structured manner such that after each update MD page is written to new location, as well as embodiments using the MD delta log architecture described herein that can be characterized as performing "updates in place" where a revised version of a MD page can be stored in the same existing physical storage location as the prior version of the MD page before updates are applied. Thus the techniques of the present disclosure using a delta-based log can be implemented in various embodiments independent of whether the persistently stored MD pages and/or other content are updated "in-place" (e.g., where updated MD pages are persisted in a non log-structured manner) or updated by storing subsequent revised versions in new physical storage locations (e.g., where MD pages are persisted in a log-structured manner or LSS-based manner).

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14*a*-14*n* through the communication medium 18. In this embodiment of the SAN 10, the n hosts 14*a*-14*n* access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14*a*-14*n* access and communicate with the data storage system 12, and also communicate with other components included in the SAN 10.

Each of the host systems 14*a*-14*n* and the data storage system 12 included in the SAN 10 are connected to the communication medium 18 by any one of a variety of connections as provided and supported in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14*a*-14*n* and the data storage system 12 can all be located at the same physical site, or, alternatively, be located in different physical locations. The communication medium 18 used for communication between the host systems 14*a*-14*n* and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
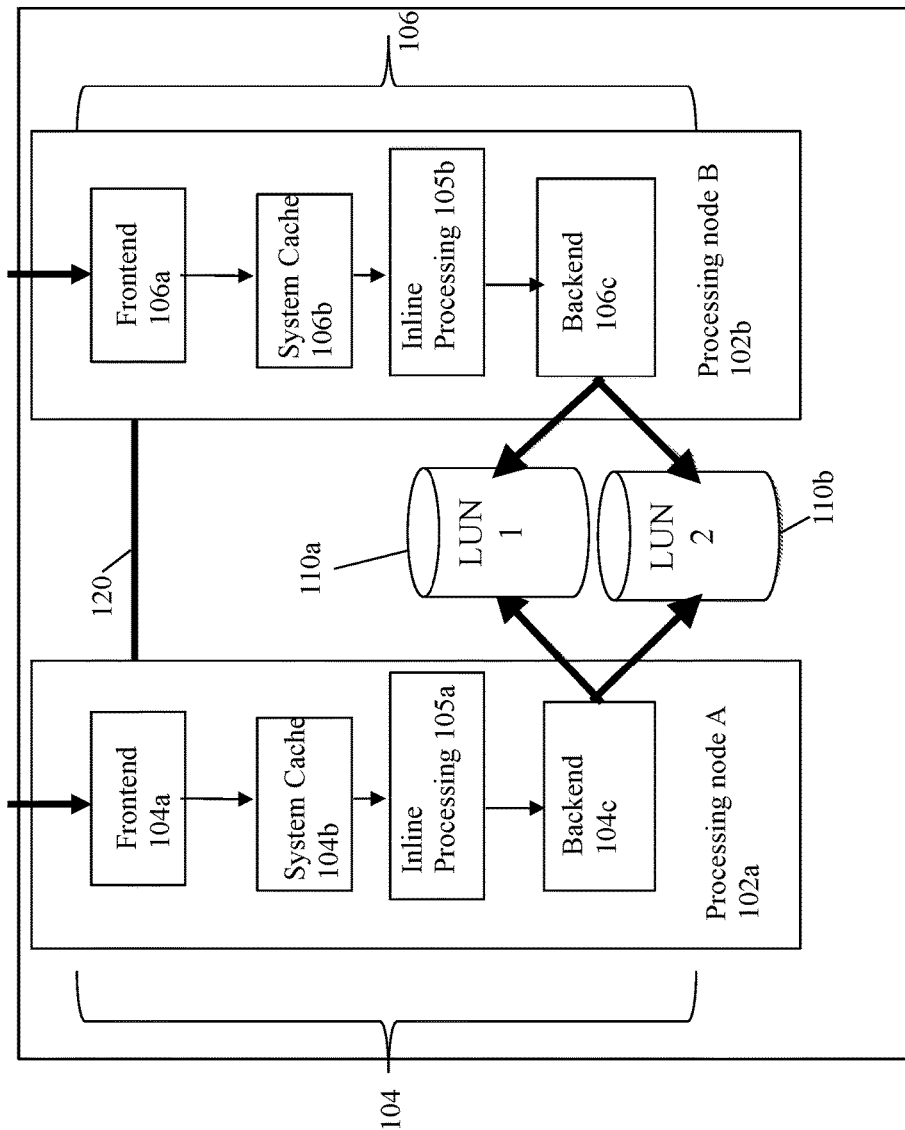
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
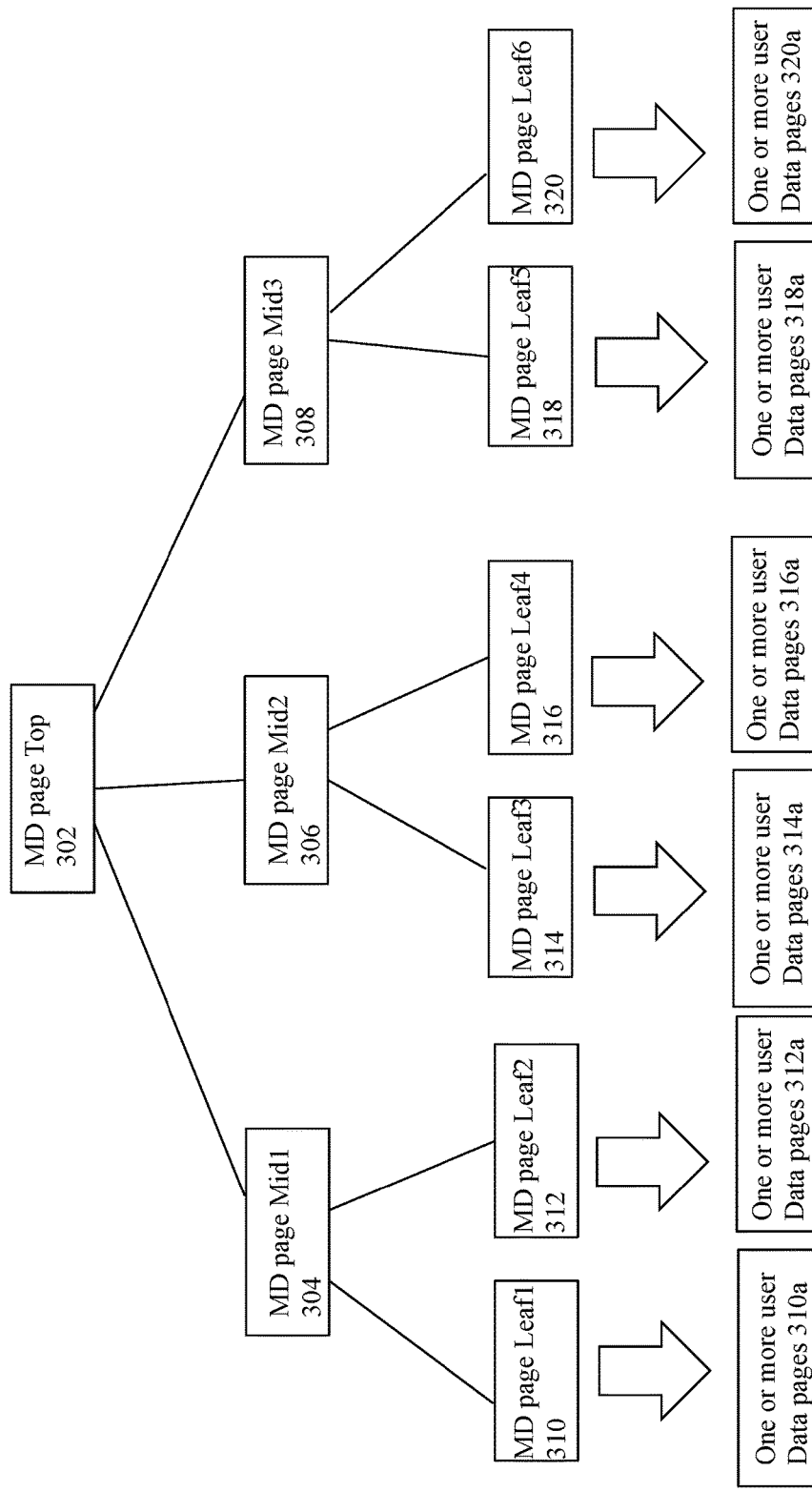
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log such as a user data (UD log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
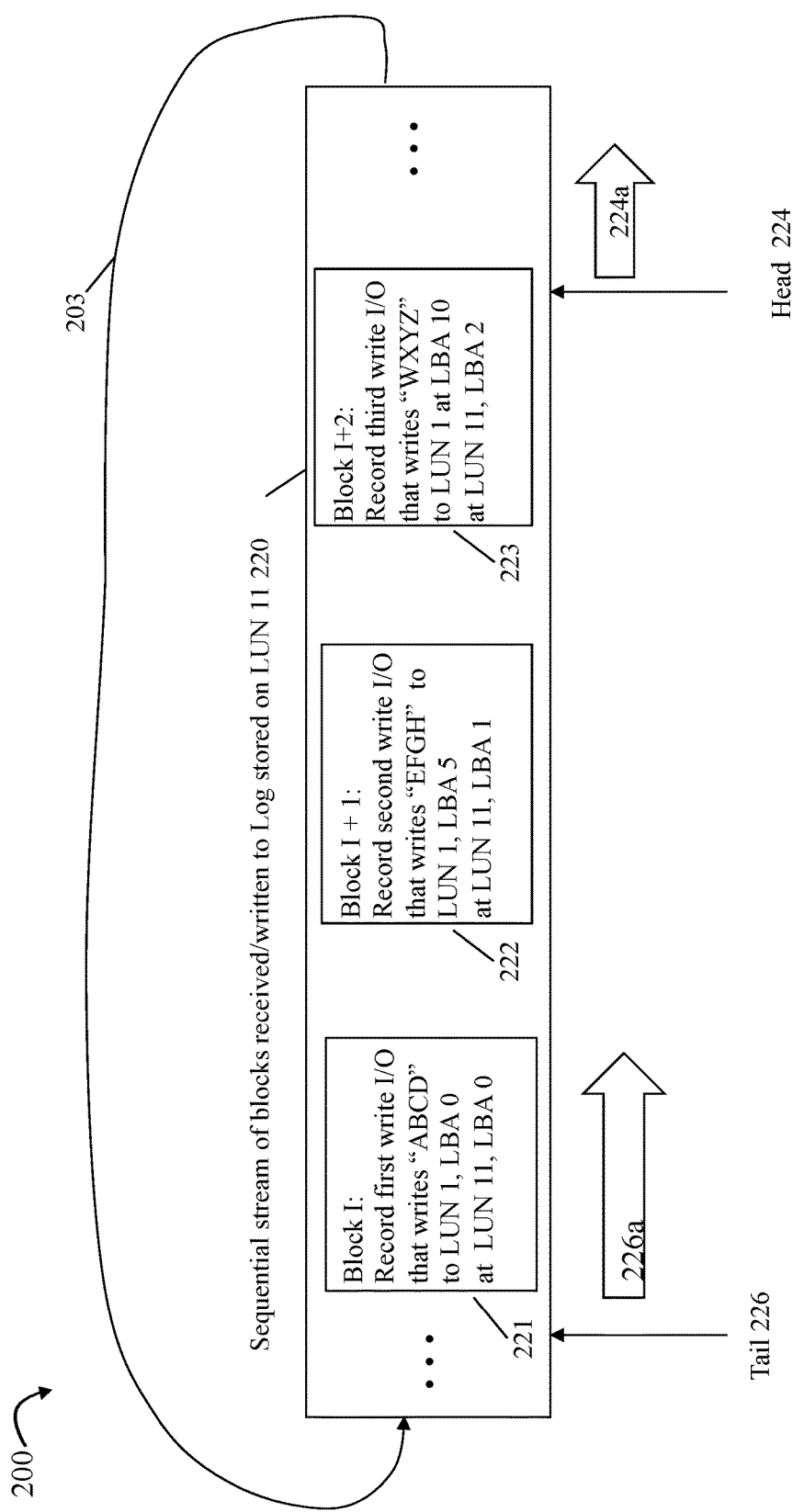
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
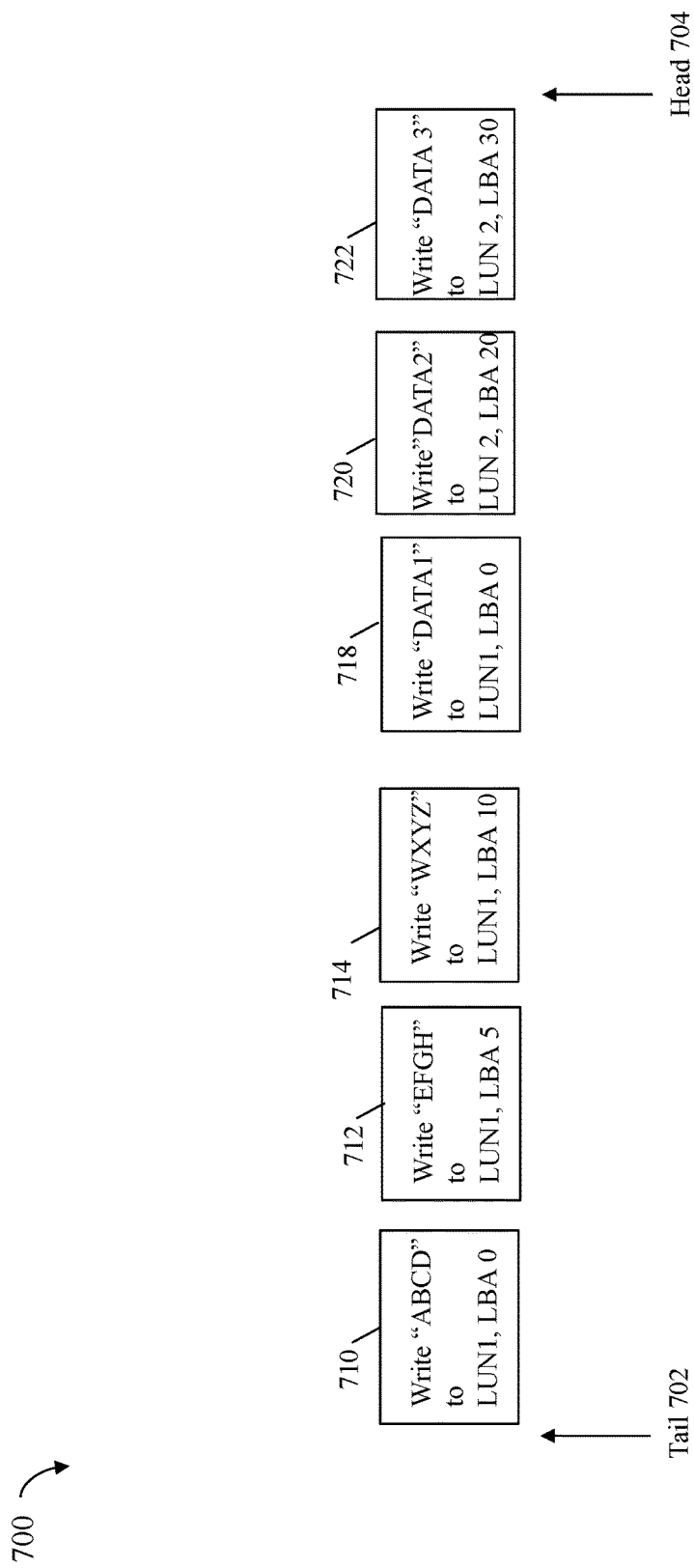

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
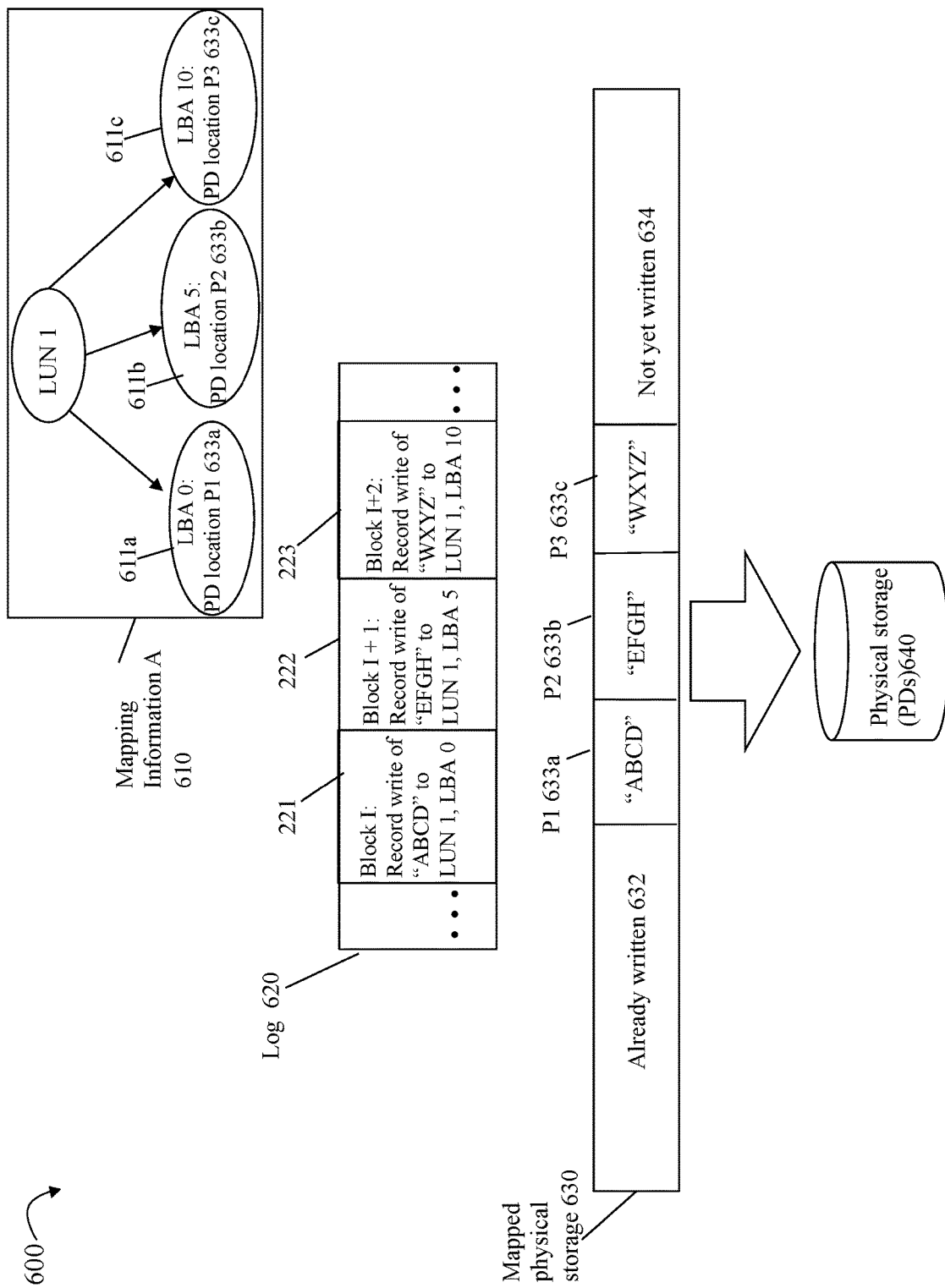

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512

LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
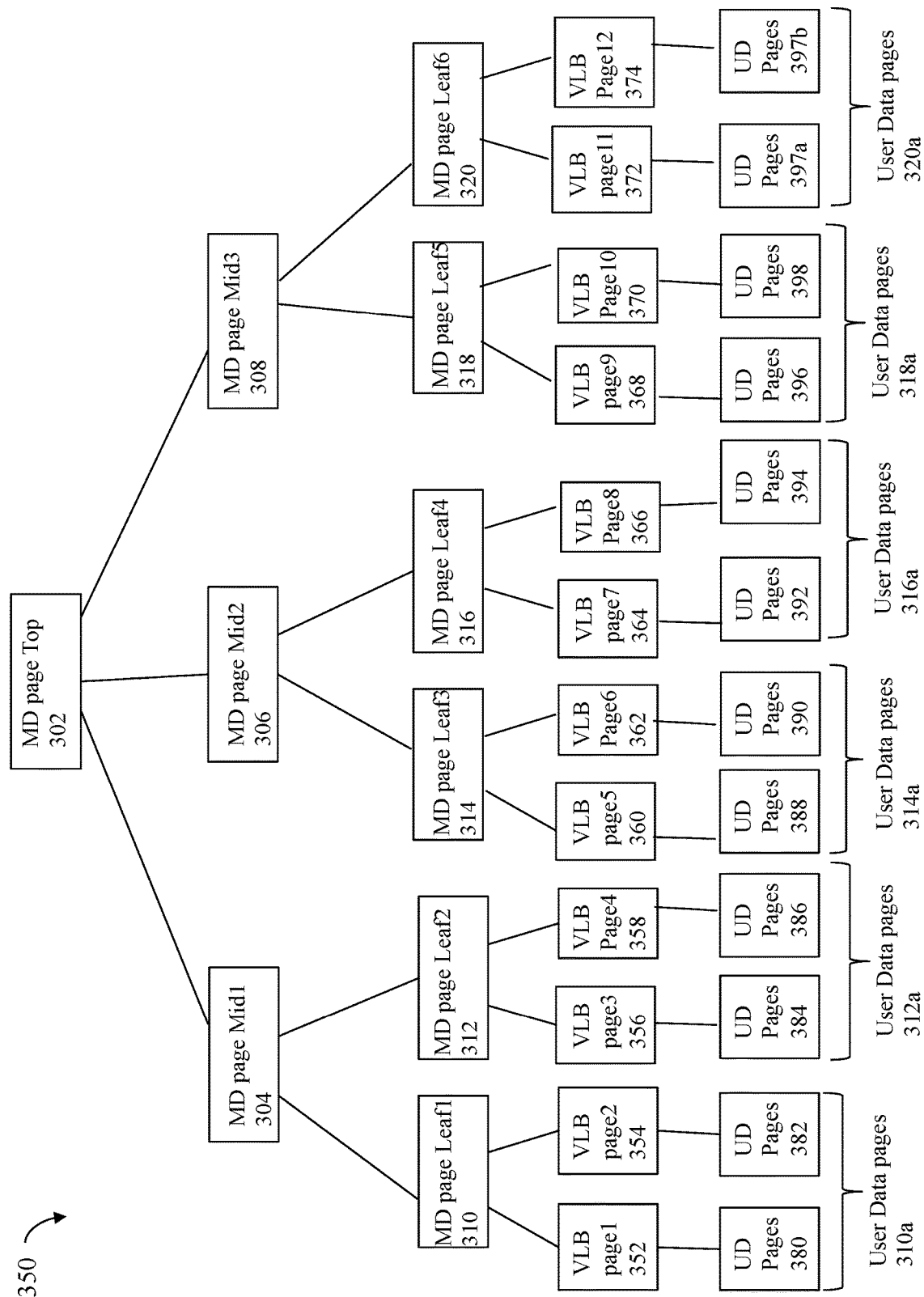

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
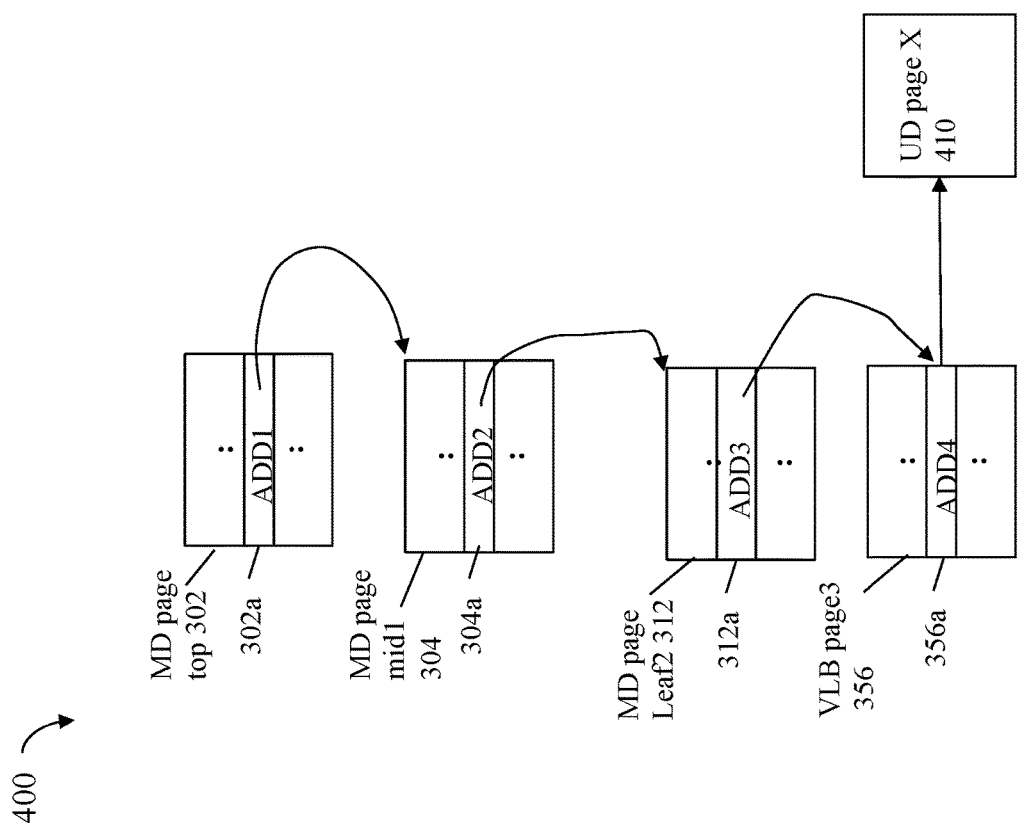

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
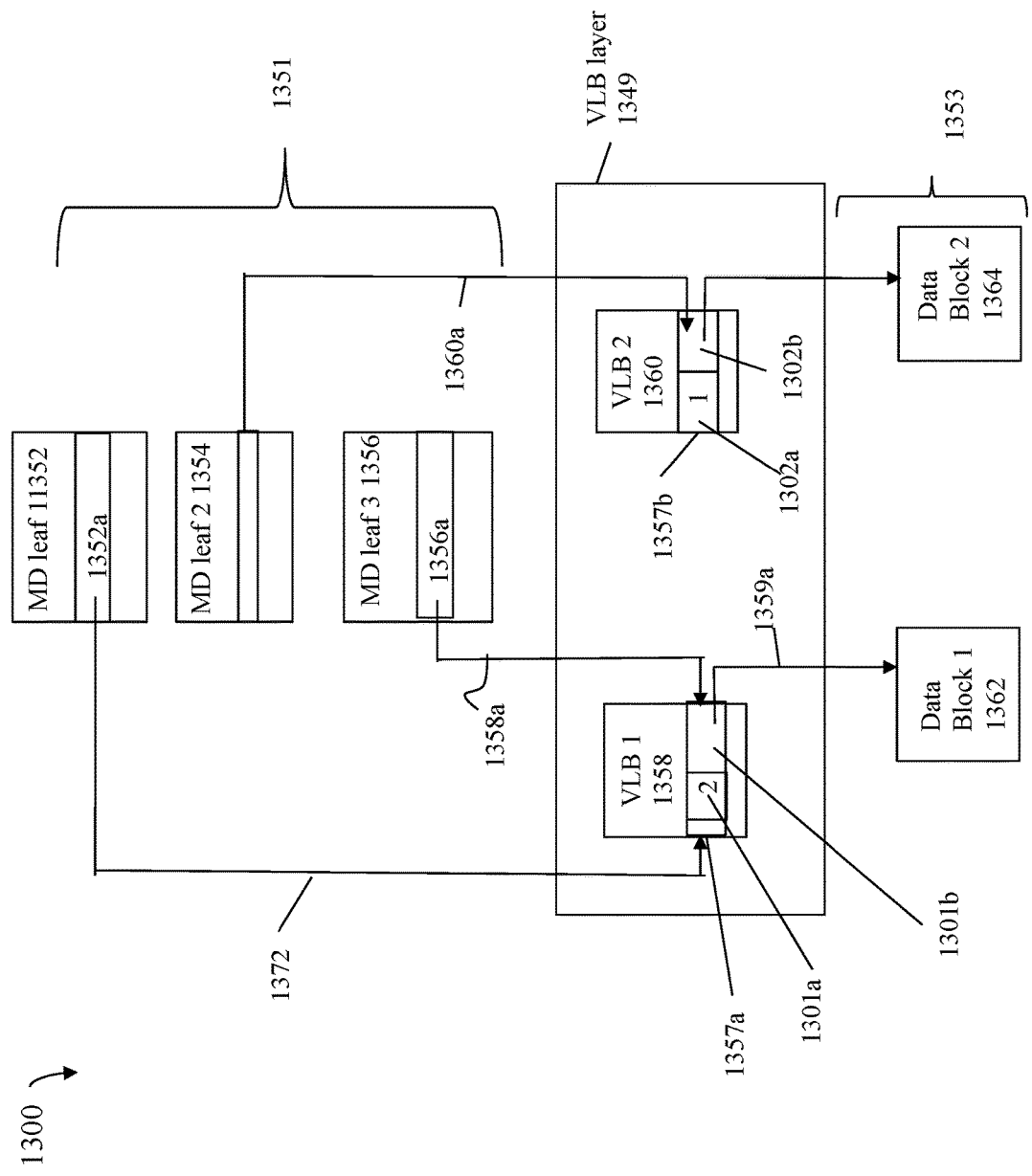

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6). In at least one embodiment, the LI can denote or can be the logical address, offset or location of the MD page. In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
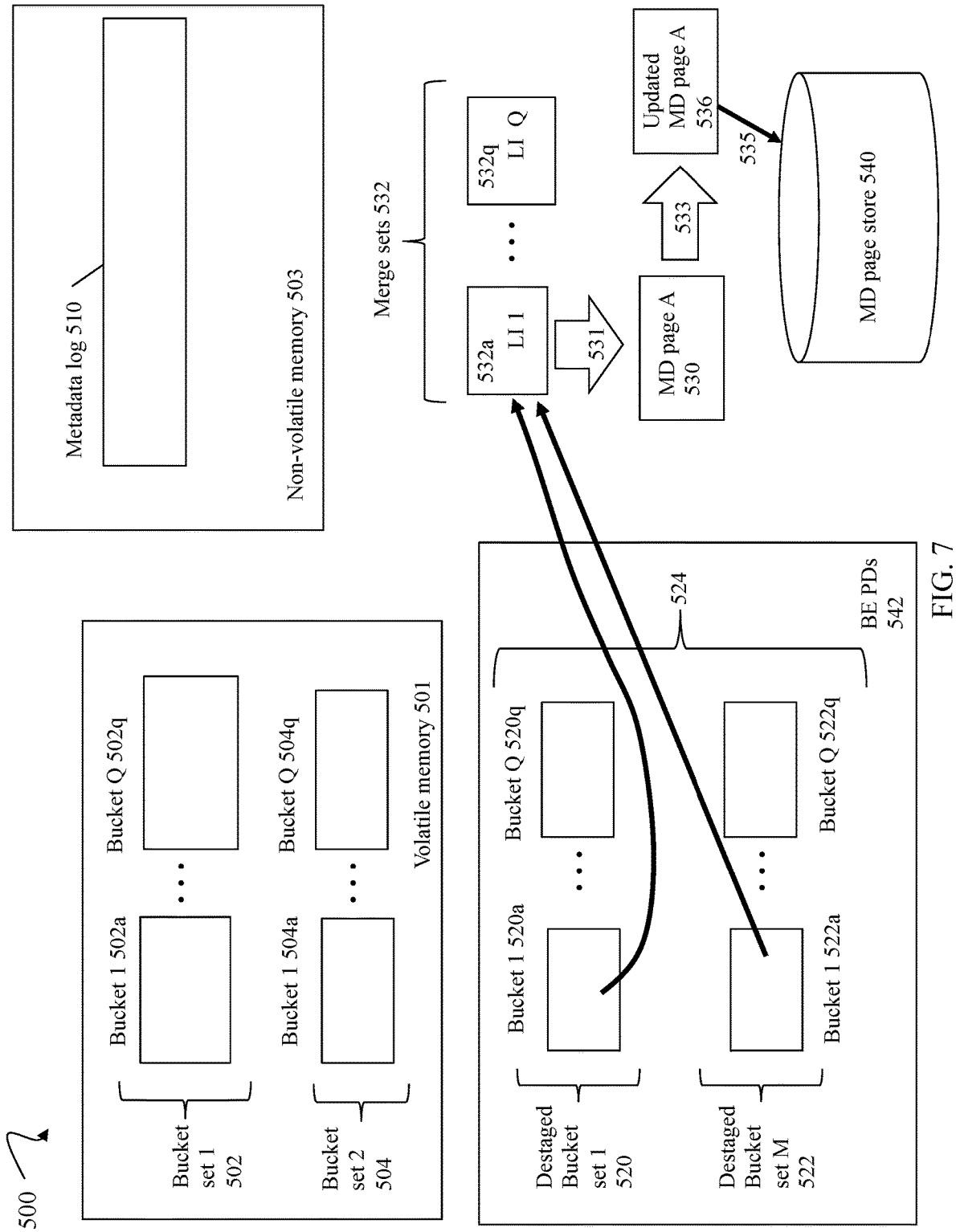
FIGS. 7, 8, 10A and 10B are examples illustrating structures and data flows in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H (LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502*a*, of the bucket set 502. The bucket 502*a* can be a binary tree including metadata updates to the MD page A. The metadata update U1 can be inserted into the sorted binary tree of 502*a* based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532*a* can denote the merge set of aggregated updates from the first buckets 520*a*, 522*a* of the destaged sets 524 for the MD page A 530. Thus the merge set or working set 532*a* of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532*a* of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a-q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing. In at least one embodiment, content can be persistently stored on BE non-volatile storage units or chunks sometimes referred to as PLBs or physical large blocks Garbage collection (GC) can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include, for example, moving first storage portions of valid data or content interspersed among holes of invalid content from multiple source PLBs to a single target PLB to thereby make free or available the multiple source PLBs.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating MD of any of the top, mid, leaf, and VLB metadata pages used in connection with mapping the logical address to the BE PD location including the content stored at the logical address. In at least one implementation, updating the corresponding mapping information and MD pages can include loading all the MD pages into the cache if any such MD pages are not already in cache. The MD pages of the mapping information can be characterized as a chain forming an access sequence of top MD page, mid MD page, leaf MD page and VLB page, where each MD page in the sequence can be accessed serially and also in the strict consecutive order of the sequence since a first page of the sequence can reference a next consecutive page, or location thereof, in the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other. In at least one embodiment such as with reference to FIGS. 3, 4, 5 and 6, such MD pages can include VLB pages and top, mid and leaf MD pages.

Figure 8:
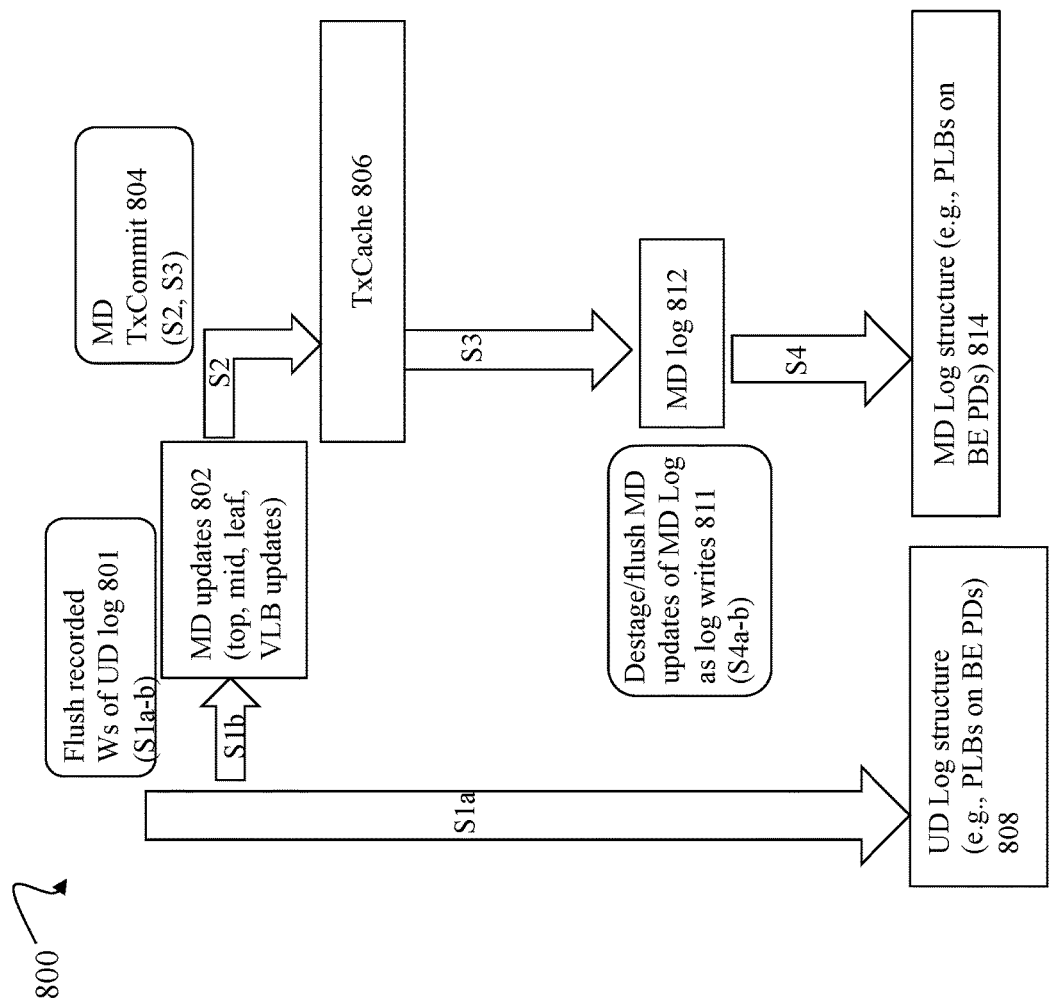

Referring to FIG. 8, shown is an example 800 illustrating various processing or workflows in at least one embodiment in accordance with the techniques of the present disclosure.

The example 800 includes a flush workflow or processing 801 when flushing writes Ws as recorded in the UD log. Consistent with other discussion herein, flushing a recorded write W1 from the UD (user data) log, where W1 writes content C1 to UD logical address UD1, can include flows S1a-b. S1a can denote storing the written content C1 at a physical address of location PA1 in the UD log structure 808 in a PLB of storage on the MD tier (e.g., stored on BE PDs). S1b can denote creating and/or updating one or more metadata pages of mapping information used to map UD1 to PA1, where PA1 currently includes the content C1 stored at UD1. Thus, S1b can include performing MD updates 802 denoting top, mid, mid, leaf and/or VLB page updates. The MD updates 802 (resulting from flushing the recorded write W1 from the UD log) can be included in a MD Tx (transaction) commit operation, workflow or processing 804 where the MD updates 802 to one or more pages are committed in the flow S2 to the Tx (transaction) Cache 806 and committed in the flow S3 to the MD log 812. In at least one embodiment, the Tx Cache 806 can denote a volatile memory cache. In at least one embodiment, the Tx Cache 806 can include an in-memory or volatile memory copy of the MD log 812, where the MD log 812 can denote the persisted copy of the MD log stored on non-volatile storage.

In a manner similar to flushing entries of the UD log, recorded MD updates included in entries of the MD log 812 (and also the in-memory copy of the MD log stored in Tx Cache 806) can be destaged or flushed as represented by element 811. Destaging or flushing MD updates of the MD log 812 can result in performing processing denoted by the flow S4. S4 can include applying one or more MD updates to a MD page to generate an updated version of the MD page, where the updated version of the MD page can be stored persistently at a new physical storage location of the MD log structure 814. The applied MD updates can be those recorded in entries of the flushed MD log.

Consistent with other discussion herein in at least one embodiment, storage systems can use logs, such as a UD log and MD log discussed above, to optimize write operation latency. The write operation including the content written can be stored persistently in a UD log and then the write operation can be acknowledged as complete to the client that sent the write operation. Subsequently, the UD log can be flushed such that the content or data written is destaged from the UD log to a physical storage location PA1 on non-volatile storage (e.g. on the BE PDs). Additionally, destaging or flushing the recorded write operation of the UD log can include performing all needed MD updates to the mapping information of the chain of MD pages to bind or map the write operation target logical address to PA1 (e.g., the physical storage location including the content written by the write operation). To provide consistency in at least one embodiment, all the related MD updates for the write operation can be transactionally recorded and persisted to the MD log as well as to the in-memory version of the MD log (e.g., HBSBs). Subsequent to recording the MD updates in the MD log, the MD log can be flushed or destaged. MD log flushing or destaging can include aggregating updates for each single MD page, applying those updates to the current version of the MD page as obtained from a first physical address or location on non-volatile storage (e.g., MD page store 540 of FIG. 7; MD log structure 814 of FIG. 8) to generate a revised version of the MD page, and then persistently storing the revised version of the MD page at a new physical address or location on non-volatile storage (e.g., MD page store 540 of FIG. 7; MD log structure 814 of FIG. 8).

Now consider a write I/O or operation workflow in at least one embodiment implementing deduplication inline when destaging or flushing the recorded write I/O from the UD log where the write I/O writes content C1 to a target logical address LA1. When the UD log flush workflow determines that written data C1 is a duplicate of content current stored persistently on the storage system, the corresponding mapping information including the chain of MD pages used to map LA1 to a physical storage location of C1 can be updated. In particular with reference back to FIG. 6, a MD leaf entry of the chain of MD pages can be updated to point to or reference a VLB entry that further points to or references the deduplicated content stored as C1 on non-volatile storage. For example, assume that MD leaf 1 1352 is included in the chain of MD pages for the write I/O and that data block 1362 stores the content C1. The entry 1352a can be updated to point (1372) to the VLB entry 1357a of VLB 1358, where the entry 1357a further points to or references (1359a) the data block 1362 (e.g., the entry 1357a includes the physical storage location of 1362 containing the content C1). Additionally, assume that the field 1301a denotes a ref count for 1362 and that prior to flushing the write I/O, 1301a has a value of 1. Prior to destaging the write I/O, only entry MD leaf entry 1356a references or points to the VLB entry 1357a. As a result of flushing the write I/O and detecting the data duplication of C1, the ref count 1301a can be incremented from 1 to 2 as illustrated in FIG. 6 to account for the added reference to 1362 by the MD leaf entry 1352a.

Thus in at least one embodiment, a corresponding MD transaction for the flushed or destaged write I/O of the UD log that writes deduplicated content C1 can include at least two metadata updates: a MD leaf page update and a VLB page update, where the MD leaf page update is an update of a MD leaf entry (1352a) to point to or reference a VLB entry (1357a) including the physical address or location of 1362 storing the written content C1, and where the VLB page update is an update to increment the ref count (1301a) of the VLB entry (1357a) used to access the written content C1 as stored persistently at 1362.

In at least one embodiment when flushing or destaging a recorded XCOPY operation from the UD log, the entire target address range of the target location of the XCOPY operation can be deduplicated (since it is a duplicate of content stored at the source location of the XCOPY). In at least one embodiment, flushing or destaging the XCOPY operation can be implemented as a MD operation that copies needed mapping information from the chain of MD pages for the source location and increments any one or more corresponding VLB refcounts associated with the stored content. In at least one embodiment for a write operation such as an XCOPY or write I/O recorded in the UD log, flushing or destaging the write operation from the UD log can include recording in the MD log MD updates needed to establish second mapping information mapping the target address range or locations to corresponding physical storage location of content currently stored at sources addresses. In at least one embodiment, flushing or destaging the write operation from the UD log can include: updating a MD leaf entry of the second mapping information for a target address such that the MD leaf entry points to or references a VLB entry VI that further references or points to a physical location of content C1 also referenced by a corresponding source location of the write operation; and incrementing a ref count of the VLB entry VI associated with the content C1. Ingesting the XCOPY command can include recording in the UD log the corresponding source and target locations or ranges of the XCOPY command. The destaging or flushing of an XCOPY command or write I/O from the UD log to persist the mapping information of the chain of MD pages for the corresponding write target addresses or locations can be performed. Subsequently, UD log and cache resources consumed can be freed. Thus, the maximum bandwidth for write I/Os and XCOPY commands can be determined and limited by the efficiency of flushing the UD log. Since the XCOPY command consumes only a single record in the UD Log but can take much longer to process than a single write I/O since the XCOPY command can represent multiple numerous storage locations or blocks, delays in flushing and freeing such a UD log can have a larger impact on latency once ingest resources are depleted.

As noted above in at least one embodiment, performing data deduplication in connection with flushing or destaging a write I/O, XCOPY or other write command or operation from the UD log can include blindly incrementing a corresponding ref count (without reading the refcount and without reading or loading the VLB page in cache) whereby a VLB page including the ref count is updated by recording a corresponding update in the MD log. In at least one implementation not using the techniques of the present disclosure, such ref count updates or increfs can require that the VLB page being updated be loaded into cache for various additional processing that is performed when destaging the write of the UD log. Such additional processing can relate, for example, to capacity leak prevention, and/or use of redirection or a chain of VLB pages. In at least one implementation not using the techniques of the present disclosure, all MD updates may be required to be performed through the cache by design such as to provide transactional and logical consistency and needed locking of cached content/pages.

In systems where the ref counts are stored in VLB pages, VLB page access can be random and sparse. In this case, the probability that a needed VLB page resides in cache at the time of issuing an increment refcount operation is relatively low and will likely be loaded from BE non-volatile storage due to the VLB page cache miss that can significantly increase UD log flushing time. Further, the additional processing noted above can further increase the UD log flushing time. Additionally, during the MD log destage, the same VLB pages also need to be in cache for MD log destage processing operations and can thereby incur yet another VLB page cache miss. Thus, in accordance with the techniques of the present disclosure in at least one embodiment, deferring such additional processing from UD log flushing or destaging to MD log flushing or destaging can provide a single point of VLB page cache miss and loading.

The UD log size and flush order dependencies of recorded UD log operations can further increase the desire and/or need for more efficient flush processing. Generally, increased UD log flush times can have an adverse ripple effect on overall storage system performance such as due to an adverse impact on processor core utilization and/or log and cache resources. Thus generally improving UD log flush rate and efficiency can improve host I/O latency and allow for increased I/O bandwidth.

In at least one embodiment, the techniques of the present disclosure include performing a blind increment ref count operation for a deduplication detected during flushing or destaging of writes from the UD log. Use of a MD log and its infrastructure such as discussed in connection with FIG. 7 allow for performing a blind increment refcount by recording the increment refcount operation for the VLB page in the MD log without accessing or reading the value of refcount of the VLB page.

In at least one embodiment in connection with performing a blind incref for data deduplication of content written by a recorded write of the UD log when flushing or destaging a write operation from the UD log, processing can include: acquiring a shared lock or read lock on the VLB page including the ref count being incremented without loading the VLB page into cache and without accessing or reading the VLB page as part of the UD log flush workflow; recording in the MD log an update U1 to increment the ref count of the VLB page; releasing the shared lock or read lock on the MD page. Thus during UD log flush or destage, the update U1 to the VLB page can be recorded in the MD log without reading or accessing the VLB page. Subsequently when the MD log is flushed or destaged, an exclusive or write lock can be taken on the VLB page; a current version of the VLB page can be read from a first location PA1 non-volatile storage into cache; the VLB page update U1 along with other MD updates to the same VLB page can be aggregated or combined and applied to the cached current version of the VLB page to generate a revised version of the VLB page; the revised version of the VLB page can be persisted to a new physical address or location PA2 on non-volatile storage; and the exclusive or write lock on the VLB page can be released.

In at least one embodiment in connection with performing a blind increment ref count for data deduplication of content written by a recorded write of the UD log when flushing or destaging the recorded write operation from the UD log, processing can include: acquiring a shared lock or read lock on the VLB page VI including the ref count being incremented without loading the VLB page into cache and without accessing or reading the VLB page in the UD log flush workflow; acquiring a write or exclusive lock on a MD leaf page LF1; recording in the MD log an update U1 to a VLB page entry E1 of VI to increment the ref count of the VLB page entry E1; recording in the MD log an update to a MD leaf page entry E2 of the MD leaf page LF1 such that MD leaf page entry E2 references or points to the VLB page entry E1; releasing the shared lock or read lock on the MD page; and releasing the write lock on MD leaf page LF1. In the foregoing, VLB entry E1 references or points to the physical storage location of deduplicated content. Thus during UD log flush or destage, the update U1 to the VLB page can be recorded in the MD log without reading the VLB page into cache and without accessing or reading the VLB page. Subsequently when the MD log is flushed or destaged, an exclusive or write lock can be taken on the VLB page; a current version of the VLB page can be read from a first location PA1 non-volatile storage into cache; the VLB page update U1 along with other MD updates to the same VLB page can be aggregated or combined and applied to the cached current version of the VLB page to generate a revised version of the VLB page; the revised version of the VLB page can be persisted to a new physical address or location PA2 on non-volatile storage; and the exclusive or write lock on the VLB page can be released.

In at least one embodiment, for a MD page that is a VLB page or any of a top mid or lead MD page, types of locks can include: a shared lock or read lock of the MD page and; an exclusive lock or write lock of the MD page. The shared or read lock of a MD page allows the holder of the shared lock read access only but not write access to the MD page. There can be multiple simultaneous shared locks on the same MD page held by different threads, processes or transactions such that all such shared lock holders can simultaneously have read access, but not write access, to the MD page. The write or exclusive lock of a MD page allows the holder of the exclusive lock exclusive access to the MD page providing the exclusive lock holder exclusive read and write access to the MD page. While a reader holds a shared or read lock on a MD page, no writer can acquire or hold the exclusive or write lock on the same MD page but other readers can acquire a read or shared lock on the same MD page. While a writer holds the exclusive or write lock on the MD page, no other writer can acquire the write lock and no reader can acquire a read lock on the same MD page.

As noted above, the maximum value MAX supported or that can be represented by a ref count field of a MD page can be dependent on the size or number of bits of the field used to store or represent the ref count. In at least one embodiment, if an attempt is made to further increment the current value of a ref count when the current value is already the MAX that can be stored or represented in the corresponding ref count field, an overflow condition occurs. One possible way to avoid overflow is to simply not let the ref count exceed the MAX value and generally not allow any further updates, either increment or decrement, to the ref count once it reaches the MAX value and not reclaim storage of content associated with this ref count. In some systems, the ref count can be used as part of identifying BE non-volatile storage of content that can be reclaimed such as, for example, when the ref count becomes zero. However, since the ref count no longer accurately represents the number of references or logical addresses storing the content, such reclamation of non-volatile storage can no longer be performed even in cases where the content is no longer actually stored at any logical address. As such, a storage capacity leak can result due to the failure to free up storage capacity when no longer needed and/or not in use.

To avoid the storage capacity leak possibility such as just noted as well as avoid the possibility of overflowing the reference count, in at least one embodiment an alternative technique can be used. In at least one embodiment, the alternative technique can include determining when incrementing the ref count would cause an overflow and, if so, creating and using another VLB instance for the same stored content or data. In other words, a first VLB entry E1 of a VLB VI can include the ref count that, if incremented, will overflow. The VLB entry E1 can reference or point to stored content C1 and the ref count can denote the current number of references by UD logical addresses to C1. In response to detecting the foregoing condition and prior to further incrementing the ref count that would result in an overflow, a corrective action can be taken. Processing of the corrective action in at least one embodiment can include creating a second VLB V2, where V2 includes VLB entry E2, where E2 can point to or reference C1 and where E2 can include a ref count also associated with C1. Rather than increment the first refcount of E1 thereby causing an overflow condition, the second refcount of E2 can be incremented. Additionally, a MD leaf entry LI can now refer or point to E2 rather than E1, where LI can be included in the chain of mapping information of MD pages used to map a target logical address LA2 of a write operation that content C1 to LA2. Naturally detecting when the next increment to a ref count will result in overflow includes reading, using and examining the current ref count value as prior to performing any such next increment, where the current ref count value can be stored in the VLB entry E1 of the VLB V1. As such, detecting when the next increment of the ref count value will result in overflow can include loading into cache and reading the VLB V1. In at least one embodiment in accordance with the techniques of the present disclosure, detecting the foregoing potential overflow condition and performing a corrective action including adding any needed new VLB such as V2, well as other additional processing, can be deferred to the MD log flush or destage workflow rather than be performed in connection with the UD log flush or destage workflow.

In at least one embodiment in accordance with the techniques of the present disclosure, flushing a recorded write from the UD log when content written by the recorded write is detected as a duplicate of existing content stored on non-volatile storage can include performing a blind increment of a ref count associated with the existing stored content. In at least one embodiment, use of the MD log and its associated infrastructure allows for recording in the MDL an increment ref count update even if performing the increment causes the ref count to exceed the maximum allowable value MAX. In this manner, using the MD log enables the techniques of the present disclosure to avoid loading into cache and/or accessing the VLB page including the reference count during the UD log flush workflow.

In at least one embodiment, the techniques of the present disclosure postpone or defer additional processing, including such processing that can include accessing or reading the VLB page including the ref count, until MD log destage or flush. In at least one embodiment, such additional processing can include: loading the VLB from BE non-volatile storage into cache; detecting, handling and avoiding a potential ref count overflow condition; and performing processing in connection with any potential redirection. Redirection is discussed in more detail elsewhere herein.

Consistent with other discussion herein in at least one embodiment, deferring or postponing the additional processing from UD log destage or flush until MD log destage of flush provides advantages due to properties or characteristics of the MD log destage workflow. For example, the MD log destage workflow can be highly scalable with a high degree of parallelism and can be much less sensitive to latency. Additionally, the MD log destage flow can already include loading the current version of the VLB from BE non-volatile storage to apply or persist corresponding flushed MD log updates to the VLB. As such it can be performance beneficial to consolidate, where possible, processing that accesses or reads the VLB content, including ef counts associated with corresponding stored content, into the MD log destage workflow.

In at least one embodiment with reference to the example 900 of FIG. 9A, an incref delta or update (sometimes referred to as an incref, regular incref or non-extended incref) 902 denoting a MD log update to increment an identified ref count associated with persistently stored content can be represented using a tuple (LI, EI, T, V) where:

LI 902*a* denotes the logical index of the VLB page;

EI 902*b* denotes the entry index denoting a particular entry, offset or location in the VLB page denoted by LI, where EI identifies the VLB page entry that includes the relevant ref count; and T 902*c* denotes the type of metadata update as INCREF denoting an update to increment by 1 a reference count of the VLB entry (LI: EI) associated with a data block containing content that may be stored at one or more logical addresses.

In at least one embodiment with reference to the example 900 of FIG. 9A, an IDP (indirect pointer) type delta or tuple 920 can be recorded in the MD log to denote an update to an IDP or indirect pointer stored in a MD leaf entry where the IDP of the MD leaf entry is used to reference a data block or physical storage location of persistently stored content on BE non-volatile storage. In connection with deduplication of content written by a flushed UD log write operation as discussed herein, an IDP delta entry can be recorded in the MD log to denote an update to a MD leaf entry to include an IDP used to reference the deduplicated content of the write operation (where the content is already stored on BE non-volatile storage). In at least one embodiment, the MD leaf entry update can be recorded in the MD log using an IDP delta or tuple (LI, EI, T, V) 920 where:

LI 920*a* denotes the logical index of the MD leaf page;

EI 902*b* denotes the entry index denoting a particular entry, offset or location in the MD leaf page denoted by LI, where EI identifies the MD leaf page entry that includes IDP field being updated;

T 920*c* denotes the type of metadata update as IDP denoting an update to an address or indirect pointer used to reference a data block (e.g., the indirect pointer may be point to, or be the address of, a VLB entry that further includes an address of, or pointer to, the data block containing user data or content stored on BE non-volatile storage); and V 920*d* denotes a value that is an address or location of a VLB entry to be stored as the IDP field of the MD leaf entry identified by LI 920*a* and EI 920*b*.

In at least one embodiment, each instance of an incref or extended incref tuple can increment a corresponding refcount by 1.

In at least one embodiment, an IDP delta or update and an incref delta or update can denote a corresponding pair of MD log entries recorded in the MD log in connection with flushing a recorded write operation from the UD log, where the recorded write operation writes content C1 to a target logical address LA1. In particular, the write operation can write content C1 that is detected during UD log flush or destage as a duplicate of an existing copy of C1 already stored on non-volatile storage. As a result, the IDP delta and incref delta can be recorded in the UD log. In this case, the incref delta can denote the increment of the ref count associated with the existing copy of C1; and the IDP delta can denote an update of a MD leaf entry included in the chain of MD pages of mapping information for LA1, where the MD leaf entry includes an IDP used to access the existing copy of C1 as stored on non-volatile storage.

In connection with ref count overflow detection and prevention/avoidance logic in at least one embodiment, a MD update or delta type of record can be used that can be referred to as an extended incref delta.

With reference to the example 901 of FIG. 9B, the extended incref update or delta (sometimes referred to as an extended incref) 904 can generally be an extension of the above-noted incref delta with a difference with respect to the type T field and with a difference that the extended incref delta includes additional fields as discussed below. The extended incref delta or tuple 904 can be recorded in the MD log as tuple 904 where:

LI 904a denotes the logical index of the VLB page;
EI 904b denotes the entry index denoting a particular entry, offset or location in the VLB page denoted by LI, where E1 identifies the VLB page entry that includes the relevant ref count; and
T 904c denotes the type of metadata update as EXTINCREF denoting an update to increment by 1 a reference count of the VLB entry (LI: EI) associated with a data block containing content that may be stored at one or more logical addresses.

In at least one embodiment, the extended incref delta 904 can include a first additional field 904d, sometimes referred to as a back reference or back pointer, that references back to or points to a corresponding MD leaf entry IDP delta or tuple used in connection with the deduplication of content. In particular, the extended incref delta can be used to increment the ref count R1 associated with stored content or data C1, and where the corresponding MD leaf entry IDP delta can denote the recorded update of a MD leaf entry LI that references or points to the VLB entry including the ref count R1 and where MD leaf entry L1 also includes a pointer or reference to the content or data C1 (that was deduplicated and is currently stored on BE non-volatile storage). In this example, the extended incref delta can include a back reference of back pointer that points to a corresponding MD leaf entry IDP delta or tuple included in the active HBSB or active in-memory MD log instance. The back reference (back ref) field 904d can reference or point to an instance of an IDP tuple 920 denoting the corresponding MD leaf entry IDP delta or tuple. Effectively the back ref field 904d can be used as a backpointer to locate a corresponding MD leaf entry.

In at least one embodiment the extended incref delta tuple 904 can also include a second additional field 904c that is a redirection flag indicating whether redirection is required for the IDP of the MD leaf entry referenced or pointed to by the back reference or back pointer field (e.g., the first additional field 904d noted above). Redirection and use of the redirection flag field 904e are described in more detail elsewhere herein.

In at least one embodiment, an IDP tuple, delta or update and an extended incref tuple, delta or update can denote a corresponding pair of MD log entries recorded in the MD log in connection with flushing a recorded write operation from the UD log, where the recorded write operation writes content C1 to a target logical address LA1. In particular, the write operation can write content C1 that is detected during UD log flush or destage as a duplicate of an existing copy of C1 already stored on non-volatile storage. As a result, the IDP delta and extended incref delta can be recorded in the UD log. In this case, the extended incref delta can denote the increment of the ref count associated with the existing copy of C1; and the IDP delta can denote an update of a MD leaf entry included in the chain of MD pages of mapping information for LA1, where the MD leaf entry includes an IDP used to access the existing copy of C1 as stored on non-volatile storage.

Consider at least one embodiment with a write operation workflow in at least one embodiment implementing deduplication inline when destaging or flushing the recorded write from the UD log where the write I/O writes content C1 to a target logical address LA1. When the UD log flush workflow determines that written data C1 is a duplicate of content current stored persistently on the storage system, the corresponding mapping information including the chain of MD pages used to map LA1 to a physical storage location of C1 can be updated. In particular with reference back to FIG. 6, a first MD log update, delta or tuple U11 can be recorded in the MD log where a MD leaf entry of the chain of MD pages can be updated to point to or reference a VLB entry that further points to or references the deduplicated content stored as C1 on non-volatile storage. For example, assume that MD leaf 1 1352 is included in the chain of MD pages for the write I/O and that data block 1362 stores the content C1. The entry 1352a can be updated to point (1372) to the VLB entry 1357a of VLB 1358, where the entry 1357a further points to or references (1359a) the data block 1362 (e.g., the entry 1357a includes the physical storage location of 1362 containing the content C1). In at least one embodiment, the foregoing MD log update U11 recorded in the MD log can be an IDP delta 920 to modify the IDP field of MD leaf entry 1352a so that the IDP field points to the VLB entry 1357a.

Also as part of the UD log flush workflow for the write noted above, a second MD log update, delta or tuple U12 can be recorded in the MD log to increment a corresponding ref count of the VLB entry 1357a. In particular, the field 1301a denotes a ref count for 1362 and prior to flushing the write I/O, 1301a has a value of 1. Prior to destaging the write I/O, only entry MD leaf entry 1356a references or points to the VLB entry 1357a. As a result of flushing the write I/O and detecting the data duplication of C1, the ref count 1301a can be incremented from 1 to 2 as illustrated in FIG. 6 to account for the added reference to 1362 by the MD leaf entry 1352a. In at least one embodiment, the foregoing increment of the ref count 1301a of the VLB entry 1357a can be recorded in the MD log using either an incref tuple 902 or an extended incref tuple 904, depending on other relevant processing, conditions and/or policy related to capacity leaks in a system. In at least one embodiment, the foregoing increment of the ref count can be implemented using an extended incref tuple 904 for use in connection with avoiding capacity leaks.

In at least one embodiment, different policies regarding capacity leaks can be implemented or enforced in a system. Some storage systems in accordance with the techniques of the present disclosure can allow a certain amount of capacity leakage where, when capacity leakage is allowed, incref deltas can be used to increment ref counts associated with content stored on non-volatile storage rather than extended incref deltas. A storage system, according to its leak-allowance policy and the current state of the system, can apply: only extended incref deltas (e.g., to avoid capacity leaks completely); only incref deltas (e.g., to optimize resources and processing cost); or can provide some combination of incref deltas and extended incref deltas (e.g., to reduce potential leaks, but not eliminate such leaks completely). In at least one embodiment, the particular policy regarding capacity leaks can be static such that, for example, the system only uses extended increfs with ref counts as discussed herein. In at least one embodiment, the particular policy regarding capacity leaks can be dynamic based, at least in part, on the current state of the system such as whether the system is busy or overloaded in accordance with one or more metrics (e.g., regarding utilization of one or more components such as CPU or processor core utilization, DA utilization or bandwidth, FE storage system port utilization or bandwidth, current I/O workload metrics (e.g., received host IOs per second, average I/O response time or latency). Generally, use of the extended incref deltas and associated processing for refcounts described herein can consume additional system resources in comparison to use of incref deltas for refcounts. As such in at least one embodiment, when the one or more metrics indicate that the system workload or level of busyness exceeds a specified threshold (e.g., where one or more of the metrics exceeds a specified corresponding threshold), then incref deltas can be used in connection with ref counts; and otherwise extended incref deltas can be used. Thus in at least one embodiment a system in accordance with the techniques of the present disclosure can dynamically select or enforce a particular policy regarding capacity leaks based, at least in part, on the current state, such as current workload, of the system.

In at least one embodiment, a corresponding MD transaction for the flushed or destaged write I/O of the UD log that writes deduplicated content C1 can include at least two metadata updates: a MD leaf page update and a VLB page update, where the MD leaf page update is an update of a MD leaf entry (1352*a*) to point to or reference a VLB entry (1357*a*) including the physical address or location of 1362 storing the written content C1, and where the VLB page update is an update to increment the ref count (1301*a*) of the VLB entry (1357*a*) used to access the written content C1 as stored persistently at 1362. As noted above in at least one embodiment, the MD leaf page update can be an IDP delta; and the VLB page update to increment the ref count can be an extended incref delta.

Generally in at least one embodiment, during MD log destage after reading a VLB page such as VLB page 1358 and the relevant ref count 1301*a* of VLB entry 1357*a*, processing can be performed that includes: aggregating multiple relevant MD log updates that increment the ref count to determine whether the final value of ref count, if updated, would exceed the allowable MAX value. Such MD log updates or increments can include incref tuples and extended incref tuples that increment the ref count 1301*a* of VLB entry 1357*a*. If MAX would not be exceeded, the refcount 1301*a* can be accordingly updated by applying the aggregated increments. Otherwise, if MAX would be exceeded, techniques of the present disclosure in at least one embodiment can generally include creating a new VLB page V2 that is a duplicate of the VLB page 1358, where V2 includes a new VLB page entry E3 that corresponds to the existing VLB page entry 1357*a*. A difference is that E3 includes a second ref count R2 that can be updated to capture the additional or extra increments that would otherwise cause the refcount 1301*a* to overflow or exceed MAX. For example, if MAX is 512 and the aggregated MD log increments, if applied to the refcount 1301*a*, would cause refcount 1301*a* to have a value of 515, there are 3 "extra" increments. The 3 extra increments can be accounted for in the second ref count R2 by setting R2 to 3. Additionally in at least one embodiment where the 3 extra increments are all extended incref tuples, the back reference or back pointer field 904*d* of each of the extended incref tuples can be used to identify MD leaf entry IDPs that can be updated to now reference or point to the new corresponding VLB page entry E3 of the new VLB page V2 (rather than the VLB page entry 1357*a* of existing VLB page 1358). More generally going forward in connection with the foregoing example, the ref count R2 can be used to accumulate the 3 extra increments as well as subsequent increments made to the ref count R2 as subsequent extended increfs are destaged from the MD log at a later point in time In at least one embodiment, updating the corresponding MD leaf entry IDPs to reference the VLB page E3 (including the new ref count R2) rather than 1357*a* can be performed by adding new corresponding IDP tuples or deltas 920 to the MD log. For example, assume there are 3 extra increments to the ref count denoted by 3 extended incref tuples noted above. In this case, the 3 new IDP tuples or deltas 920 can be the same as those IDP tuples referenced using the back reference or back pointer field 904*d* of the 3 extended incref tuples with the difference that the 3 new IDP tuples each have a value or V field 904*d* that references or points to the new corresponding VLB page entry E3 of the new VLB page V2 (rather than the VLB page entry 1357*a* of existing VLB page 1358). As an alternative to generating the 3 new IDP tuples noted above, an embodiment can alternatively update the value field V 904*d* of the 3 existing 3 IDP tuples that are back referenced using field 904*d* of the extended incref tuples so that the field 904*d* of the 3 existing IDP tuples references or points to the new corresponding VLB page entry E3 of the new VLB page V2 (rather than the VLB page entry 1357*a* of existing VLB page 1358). In this latter scenario where the 3 existing IDP tuples are updated, the MD log destage workflow can apply a strong destage ordering such that, for example, MD log updates to VLBs are first applied by first destaging VLBs, subsequently followed by destaging MD log updates for the remaining pages. In this latter scenario, destaging generates already fixed/updated IDPs of MD leaf pages. In this latter scenario, the strong destage ordering noted above can be implemented in at least one embodiment either by separating VLB buckets of MD log updates from others, or by performing a two-pass destage (where the second destage pass can perform any needed fixing/updating of MD leaf IDPs).

Figure 10A:
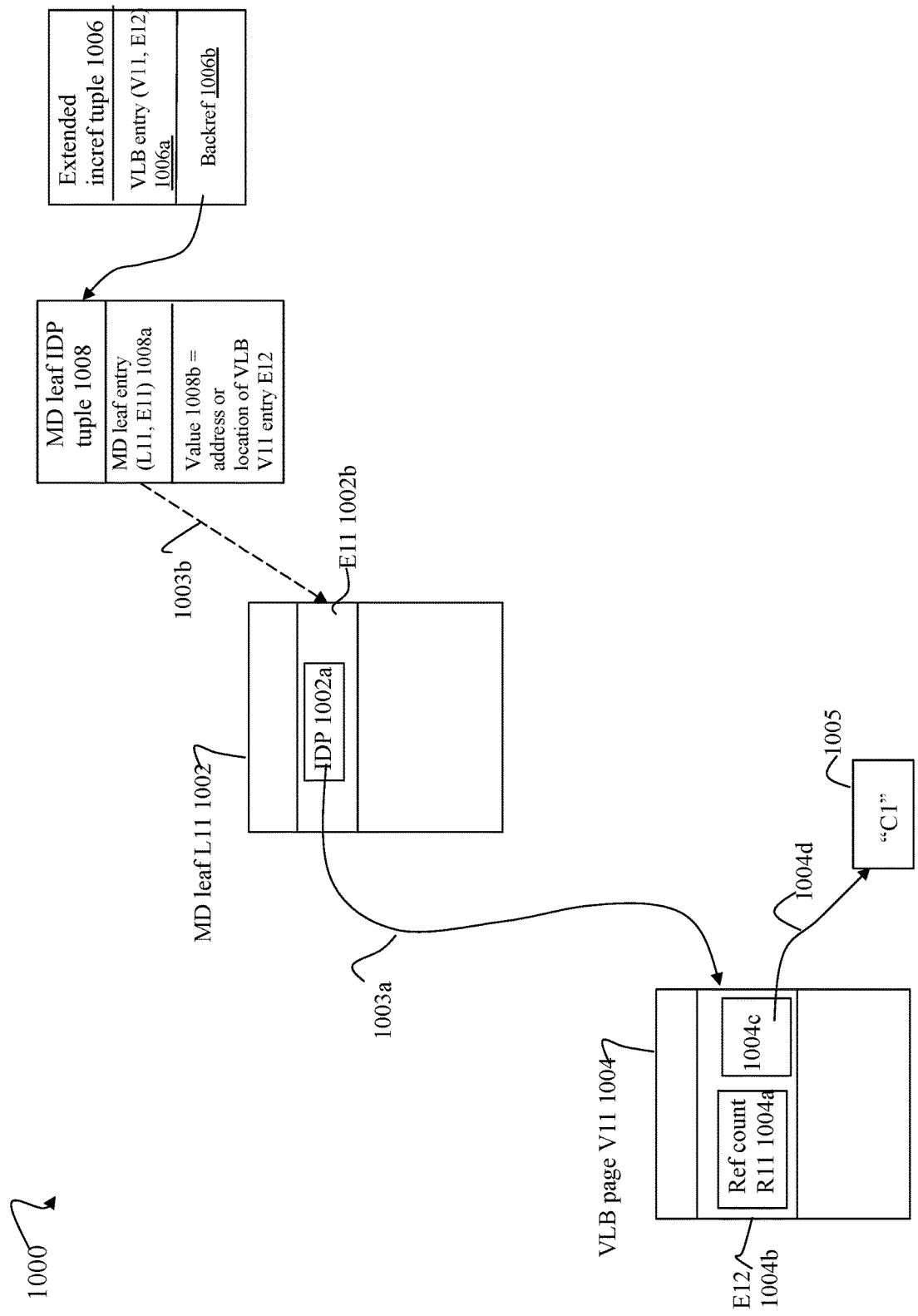
Figure 10B:
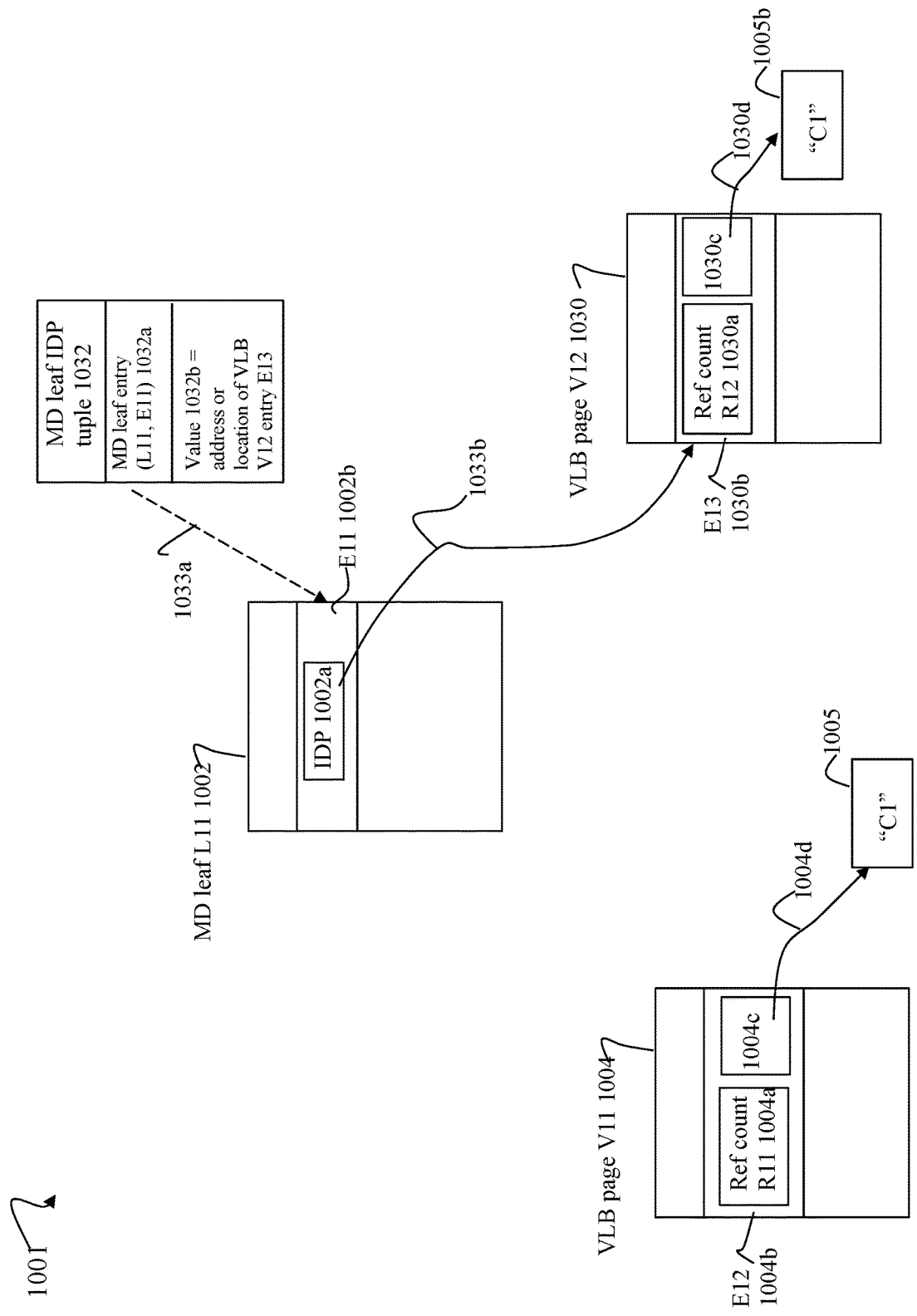

Referring to FIGS. 10A and 10B, shown are examples 1000, 1001 illustrating processing as described above that can be performed in at least one embodiment in connection with ref count overflow detection and prevention logic during MD log destage in accordance with the techniques of the present disclosure.

The example 1000 illustrates the state of various metadata pages 1002, 1004 at a first point in time T1 when performing a MD log destage. The in-memory MD log, such as a frozen HBSB, being destaged can include an extended incref tuple 1006 and MD leaf IDP tuple 1008. Consistent with other discussion herein, the MD log tuples 1006, 1008 can be a corresponding pair of tuples denoting MD log updates recorded as part of UD log flush or destage of a write operation that writes content C1 to logical address LA1. The tuples 1006, 1008 can be recorded in at least one embodiment in connection with detecting that the content C1 written by the write operation is a duplicate of an existing copy of C1 1005 as already stored persistently on the storage system. The MD page 1002 and the VLB page 1004 can be included in the chain of MD pages of mapping information used to map LA1 to the physical storage location of deduplicated content C1 1005. Thus the tuple 1006 can denote the recorded update to the IDP 1002*a* of MD leaf entry E11 to point to or reference (1003*a*) E12 1004*b* that further includes pointer field 1004*c* that references or points to (1004*d*) the physical storage location of C1 1005. Also, the tuple 1008 can denote the recorded ref count R11 1004*a* of E12, where the ref count R11 denotes the current reference count with respect to the content C1 1005.

The example 1000 can denote the state of the MD pages 1002, 1004 at a first point in time T1 after the MD leaf IDP tuple 1008 has been flushed from the MD log and applied to MD leaf L11 1002. However at this first point in time T1, the extended incref tuple 1006 has not yet been destaged and not yet applied to the VLB entry E12 1004*b*. The MD leaf IDP tuple 1008 includes LI and EI fields 1008*a* identifying the MD leaf entry 1002*b* whose IDP field 1002*a* is updated to the address or location of VLB entry E12 1004*b* of VLB V11 1004 (where the address or location of VLB entry E12 1004*b* is included in the value field 1008*b*). Thus element 1003*a* denotes that, after destaging and applying the MD leaf IDP tuple 1008 to the MD leaf L11 1002, the IDP field 1002*a* of the MD leaf entry E11 1002*b* references or points to the VLB page entry E12 1004*b*.

Subsequently, the extended incref tuple 1006 can be destaged from the MD log. The extended incref tuple 1006 indicates that the ref count R11 1004*a* of the VLB entry E12 1004*b* is to be incremented. The LI and EI fields of the extended incref tuple 1006 are denoted by 1006*a* where the VLB entry E12 is identified in accordance with 1006*a*. Additionally, the extended incref tuple includes a back ref field 1006*b* that references or points to the corresponding MD leaf IDP tuple 1008. Processing performed in connection with destaging 1006 can include performing overflow detection and prevention with respect to the ref count R11 1004*a* to be incremented by applying the extended incref tuple 1006. Processing can generally include aggregating the extended incref tuple 1006 in combination with any other relevant extended incref or regular incref tuples to be applied to the ref counter R11 1004*a*. In this example for simplicity, it is assumed that there is only a single such relevant tuple 1006. In connection with destaging 1006 from the MD log, processing can determine what would be the updated value of R11 1004*a* as a result of applying and thus incrementing R11 1004*a* by 1. If the updated value of R11 1004*a* as calculated does not exceed the specified MAX value, where values over MAX can denote overflow conditions of R11, then the updated value for R1 can be written out to the persistently stored VLB page V11 1004. Otherwise, if the calculated updated value of R11 exceeds MAX, excess ref count processing can be performed. MAX can denote a maximum allowable refcount value.

With reference to FIG. 10B, excess refcount processing can include allocating a new VLB V2 1030 and accumulating the extra or additional increment of the tuple 1006 in the ref count R12 1013*a* of the VLB entry E13 1030*b*. Generally, entries of the VLB page V12 1030 can correspond to entries of the VLB page V1 1004 such that E13 1030*b* of VLB 1030 corresponds to the entry E12 1004*b* of VLB 1004. The ref count R12 1030*a* can be used to accumulate the extra incref denoted by the extended incref tuple 1006. Additionally, any subsequent increments to the ref count R12 1030*a* in connection with subsequently destaged extended increfs and/or regular increfs can be accumulated in the ref count R12 1030*a* rather than ref count R11 1004*a*.

In at least one embodiment, the ref count R2 1030*a* can be incremented in accordance with destaging the extended incref tuple 1006. Additionally, the IDP 1002*a* of the MD leaf entry E11 1002*b* now needs to be further updated from the state as in FIG. 10A to the state as in FIG. 10B. In particular, the IDP 1002*a* of MD leaf entry E11 1002*b* in FIG. 10A points (1003*a*) to the VLB entry E12. The backref pointer 1006*b* of the extended incref tuple 1006 can be used to locate the IDP tuple 1008 including the LI and EI fields 1008*a* used to identify the corresponding MD leaf entry E11 1002*b* including the IDP 1002*a* to be updated.

Processing can be performed to update IDP 1002*a* to reference or point to (1033*b*) the VLB entry E13 whereby ref count R12 1030*a* is now used to accumulate references to associated content rather than ref count R11 1004*a*.

To update the IDP 1002*a*, a new IDP tuple 1032 can be written to the MD log. The new IDP tuple 1032 can be a MD leaf IDP tuple that indicates to update MD leaf entry E11 1002*b* to include the address or location of VLB entry E13 1030*b*. The LI and EI fields of the IDP tuple 1032 can identify the MD leaf entry E11 1002*b*. The value field 103*b* of the IDP tuple 1032 can denote the address or location of E13 1030*b*. Subsequently, the new IDP tuple 1032 is destaged from the MD log, such as in a next MD log destage cycle, and applied to the MD leaf entry E11 1002*b* to update the IDP 1002*a* to reference (1033*b*) the VLB entry E13 1030*b* including the refcount R12 1013*a* as represented at the second point T1 in time in the example 1001.

Consistent with discussion above, extra increments that would otherwise overflow the refcount R11 1004*a* can now be accumulated in the ref count R12 1030*a*, until the ref count R12 1030*a* would similarly otherwise overflow. Additionally, the back reference fields 904*d* of extended increfs that are rerouted and accumulated in R12 1030*a* of E13 1030*b* rather than R11 1004*a* of E12 1004*b* can be used to identify corresponding MD leaf entries such as E11 1002*b* having IDP fields (such as 1002*a*) that need to be updated to reference or point to E13 1030*b* rather than E12 1004*b*. In at least one embodiment as noted above, the update to IDP 1002*a* can be accomplished by recording a new IDP delta 1032 in the MD log. Alternatively in at least one embodiment rather than record the new IDP delta 1032 to update IDP 1002*a*, the existing IDP delta 1008 can be updated prior to destaging such that its value field 1008*b* identifies VLB entry E13 1030*b* rather than VLB entry E12. In this latter scenario as noted above and with reference to FIG. 10A, the extended incref tuple 1006 needs to be destaged prior to the IDP tuple 1008.

Additionally in at least one embodiment, processing to handle the detection of the potential overflow can also include associating a duplicate copy of C1 1005*b* with the VLB entry E13 1030*b*. In particular, the VLB entry E13 1030*b* includes pointer or address field 1030*c* that references or points (1030*d*) to the physical storage location storing the duplicated content C1 1005*b*. In at least one embodiment as illustrated in the example 1001, C1 can be deduplicated from multiple logical addresses where, due to the overflow processing described, there can be two duplicate instances 1005, 1005*b* of the same content C1 where each such instance can be associated with a different ref count of a different VLB entry. Alternatively in at least one embodiment, rather than have the VLB page entries E12 1004*b* and E13 1030*b* respectively point to two copies of the same content C1, the VLB page entries E12 1004*b* and E13 1030*b* can both point to the same single instances of the content C1 (e.g., both 1030*c* of E13 and 1004*c* of E12 can point or reference the content C1 1005).

In at least one embodiment at a point in time T3 subsequent to T2, it may be possible to similarly detect a potential overflow as a result of aggregated increments to the ref counter R12 1030a. In this case, processing described above can be repeated by similarly creating another VLB page V13 used to accumulate the overflow or extra increments of R13 1030a that, if applied to R13 1030a, would cause R13 1030a to exceed MAX. In this manner, processing as just described can be repeated any suitable number of times with respect to the same content C1 as a potential overflow is detected for each associated refcount.

In at least one embodiment, VLB defragmentation processing can be performed in an ongoing manner, for example, as a background process. VLB defragmentation processing can include consolidation and relocation of VLBs that are sparsely populated with valid data. For example, a first VLB may be a first size Z1 including 512 valid entries. However, over time, entries of the first VLB can include invalid or stale content such that the first VLB now includes relatively few valid entries. As a result, VLB defragmentation can include relocating the sparse number of valid entries of the first VLB to a second VLB having a second size Z2 that is smaller than Z1 but where the size Z2 of the second VLB is sufficient to store the relatively small number of valid entries. In this manner, the storage of the much larger first VLB can be reclaimed and reused. As a result of such relocation or redirection of first VLB entries from the first VLB to the second VLB, any existing references to the first VLB entries that have been redirected or relocated to other VLB entries of the second VLB need to be updated. For example, consider the IDP field of a MD leaf entry where the IDP field references or points to a first VLB entry of the first VLB that is redirected or relocated from the first VLB to a second VLB entry of the second VLB. In this case, the IDP field of the MD leaf entry needs to now be updated (e.g., corrected or fixed) to reference or point to the new updated location, the second VLB entry of the second VLB. Put another way, the MD leaf entry's IDP field needs to be updated from the stale or invalid pointer or reference (to the first VLB entry of the first VLB) to the revised pointer or reference to the second VLB entry of the second VLB.

In at least one embodiment, a redirection table or database (DB) can be maintained and used to denote any VLB/VLB entry relocations, movements or redirections where the VLB entry is relocated from an original source address or location to a new destination address or location. Processing such as in connection with VLB defragmentation can accordingly update the redirection table or DB as VLBs and/or VLB entries are relocated. As may be needed, the redirection table or DB can be queried to determine, for a source location or address of a VLB entry, a corresponding new destination address or location of the VLB entry. In at least one embodiment, the redirection table or DB can include redirection entries each denoting a redirection or relocation of a corresponding VLB entry (e.g. a redirection entry can map a VLB entry source address or location to a corresponding new destination address or location). In at least one embodiment, if there is no corresponding redirection entry in the redirection table or DB for a given VLB entry source address or location, then the VLB entry has not been redirected or relocated. As a variation in at least one embodiment, the redirection table or DB can include a redirection entry for a VLB entry where, if the VLB entry has not been relocated, the source and destination addresses or locations can be the same (e.g., the redirection entry maps the source address or location of the VLB entry to the same source address or location).

In at least one embodiment, a leaf fix or update process can execute to accordingly perform any needed updates to IDPs of MD leaf entries for VLB entries that have been redirected or moved such as due to the VLB defragmentation noted above. In at least one embodiment, leaf fix or update processing can include traversing MD leaf entries of a MD leaf and performing any IDP field updates needed due to relocated or redirected VLB entries referenced by such IDP fields. In at least one embodiment, leaf fix or update processing can scan MD leaf entries in increasing entry order and can determine whether the IDP of the MD leaf entry is stale or invalid since it references a relocated VLB entry. If the IDP field is determined to be stale by including an old or invalid pointer or reference to a VLB entry that has been redirected or relocated, the leaf fix or update processing can accordingly update the IDP field to include the new updated location or address of the relocated/redirected VLB entry. If the IDP field is otherwise determined not to reference a relocated or redirected VLB entry whereby the IDP field currently includes a valid reference or pointer to a VLB entry, no update to the IDP field is needed and leaf fix or update processing proceeds to process any next or subsequent MD leaf entries in the current MD leaf. Once leaf fix or update processing has been completed for all entries of the current MD leaf, another MD leaf can be similarly processed to perform any needed updates to IDP fields of MD leaf entries. In at least one embodiment, leaf fix or update processing can use the redirection table or DB to determine whether an address, pointer or reference to a VLB entry is stale thereby denoting a relocated or redirected VLB entry by querying the redirection table or DB. In this manner in at least one embodiment, if the redirection table or DB does not include a corresponding redirection entry indicating that a given source address of a VLB entry has been relocated or redirected to a new destination address, an existing reference to the VLB entry such as a MD leaf entry including the VLB entry source address is still valid and does not require updating. Otherwise, leaf fix or update processing can update the MD leaf entry to include the new destination address of the VLB entry rather than the stale invalid source address.

In at least one embodiment during UD log destage, a recorded write operation W1 that writes content C1 to a target address LA1 can be destaged from the UD log. Destaging W1 from the UD log can include performing data deduplication processing that determines C1 is a duplicate of an existing copy of C1 as currently stored at the physical storage address or location PA1 on non-volatile storage. The mapping information mapping LA1 to PA1 can include a MD leaf entry E11 with an IDP field that references or points to a VLB entry E12. UD log destaging of W1 can include determining whether the leaf fix or update processing has already performed any needed update or fix to the IDP field of MD leaf entry E11, or otherwise that any such needed processing has not yet been completed by the leaf fix or update process. If leaf fix or update processing has already been completed for the MD leaf entry E11, no further redirection resolution is needed for the VLB entry address or location as included in the IDP field of MD leaf entry E11. Otherwise, if leaf fix or update processing has not been completed for the MD leaf entry E11, further redirection resolution is needed for the VLB entry address or location as included in the IDP field of MD leaf entry E11. In at least one embodiment, such further redirection resolution processing can be performed during MD log destage as discussed elsewhere herein.

In at least one embodiment as discussed herein, MD log updates recorded in connection with the deduplication of C1 for WI can include an IDP tuple and an extended incref tuple, where the IDP tuple is a MD leaf IDP tuple and where the extended incref tuple includes a back reference or pointer to the corresponding MD leaf IDP tuple. If further redirection resolution is needed for the VLB entry address or location as included in the IDP field of the MD leaf entry identified by the MD leaf IDP tuple, the redirection flag of the extended incref tuple (that includes the back reference to the MD leaf IDP tuple) can be set (e.g., =1, yes or true) to indicate redirection resolution is needed for the IDP of the MD leaf entry corresponding to the back reference field of the extended incref tuple.

In at least one embodiment as noted above, leaf fix or update processing can be performed for each MD leaf entry of a MD leaf in consecutive sequential order. In at least one embodiment, each MD leaf can include a number of entries such as 512 where each entry has an associated integer-based index or offset where entries can be assigned consecutive sequential integers or offsets denoting a relative position in the MD leaf. Thus MD leaf entries have an associated increasing consecutive sequential order based on the foregoing index or offsets. In at least one embodiment, MD leaf entries can be processed by leaf fix or update processing in sequential increasing index or offset order. As such in at least one embodiment in which MD leaf entries are processed in increasing index or offset order, leaf fix or update processing can maintain a scan offset for a MD leaf denoting the highest index or offset of the most recently processed MD leaf entry for which leaf fix or update processing is complete.

Processing can be performed such as during UD log destage in connection with destaging a recorded write to determine whether redirection resolution is required with respect to an IDP field of a MD leaf entry E11 where the IDP field references or pointer to a VLB entry (e.g., IDP entry includes a pointer, address or location of a VLB entry). During the UD log destage processing associated with the destaged write of the UD log as discussed in more detail elsewhere herein, processing can include adding or recording a corresponding pair of tuples—an IDP tuple and an extended incref tuple—where a redirection flag of the extended incref tuple can be set to indicate whether such further redirection resolution is needed during MD log destage of the foregoing pair of tuples to determine whether the IDP field of the IDP tuple needs to be updated to a new destination address or location of a referenced VLB entry. In at least one embodiment, a query can be made to determine whether the offset or index of the MD leaf entry E11 is less than the current scan offset of the MD leaf L11. If so, the IDP field of E11 is determined to have a valid reference, pointer or address to VLB entry E12 and no further redirection resolution is needed with respect to the IDP field of E11 and the corresponding extended incref tuple's redirection flag can be set (e.g., to 0, no or false) to indicate no further redirection resolution is needed. Otherwise, if the offset or index of the MD leaf entry E11 is equal to or greater than the current scan offset of the MD leaf L11, further redirection resolution is needed for the IDP field of E11 (to ensure that the IDP field of E11 includes a valid pointer, location or address of VLB entry E12). Accordingly in the latter case, the extended incref's tuple's redirection flag can be set (e.g., to 1 or true) or indicate further redirection resolution is needed.

In at least one embodiment, further redirection resolution processing can be performed as part of MD log destaging/ destage processing. Redirection resolution processing can be performed to determine whether a VLB entry address or location (e.g., as included in an IDP field of a MD leaf entry) has been relocated; and if so, update references to the VLB entry (e.g., such as the reference by the IDP field of the MD leaf entry). What will now be described are flowcharts summarizing processing described above that can be performed in at least one embodiment in accordance with the techniques of the present disclosure.

Figure 11A:
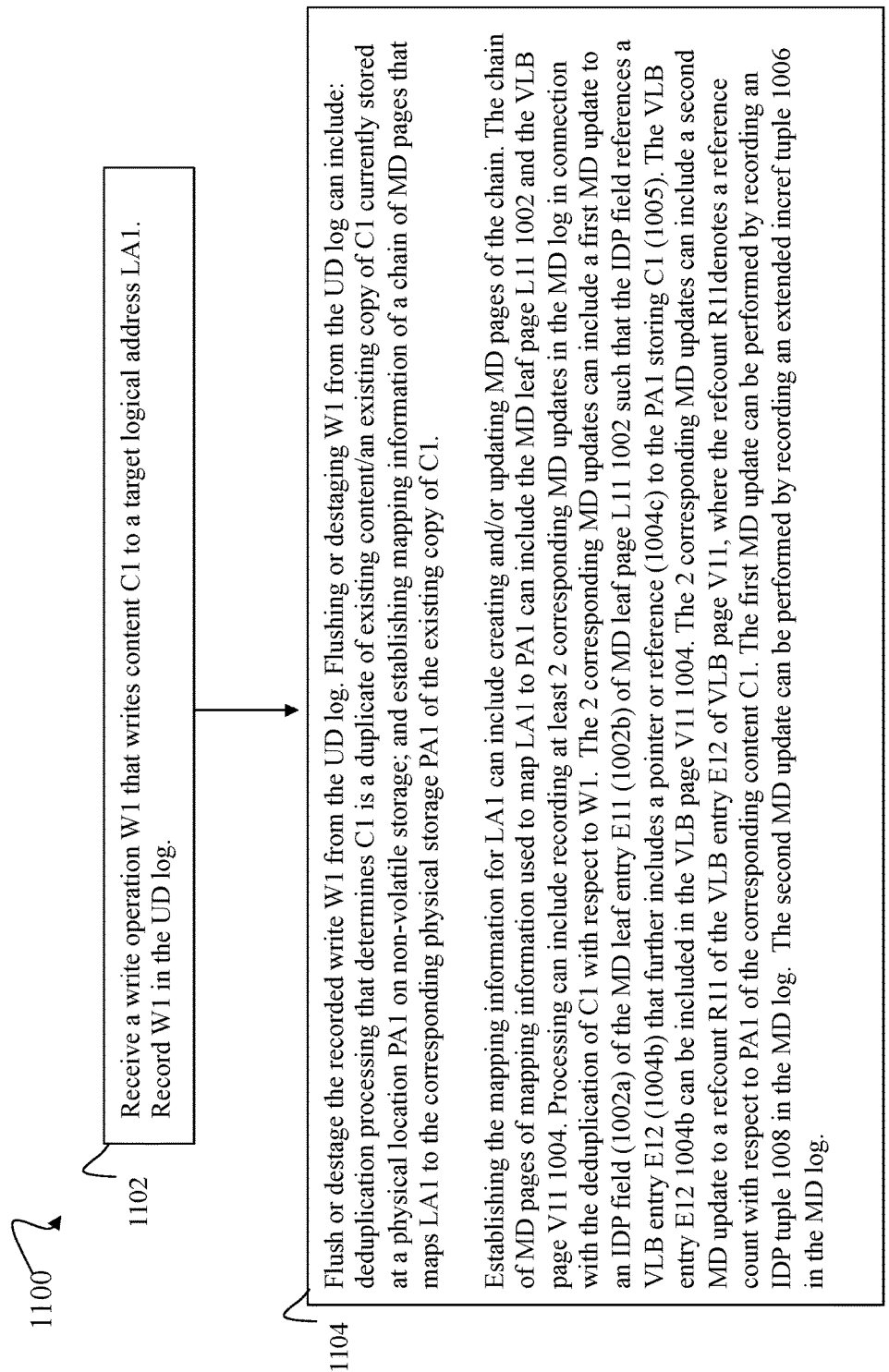
FIGS. 11A, 11B, 12A and 12B are flowcharts of processing steps that can be performed in at least one embodiment in accordance with the techniques of the present disclosure.

Referring to FIG. 11A, shown is a flowchart 1100 of processing that can be performed in connection with UD log-related processing that can be performed in at least one embodiment in accordance with the techniques of the present disclosure.

The steps of the flowchart 1100 refer to elements of FIGS. 10A and 10B to more clearly illustrate described processing in at least one embodiment.

At the step 1102, a write operation WI can be received from a host at a storage system. The write WI can write content C1 to a target logical address LA1. The write WI can be recorded in the UD log. From the step 1102, control proceeds to the step 1104.

At the step 1104, processing can be performed to flush or destage the recorded write WI from the UD log. Flushing or destaging W1 from the UD log can include: deduplication processing that determines C1 is a duplicate of existing content/an existing copy of C1 currently stored at a physical location PA1 on non-volatile storage; and establishing mapping information of a chain of MD pages that maps LA1 to the corresponding physical storage PA1 of the existing copy of C1.

Establishing the mapping information for LA1 can include creating and/or updating MD pages of the chain. The chain of MD pages of mapping information used to map LA1 to PA1 can include the MD leaf page L11 1002 and the VLB page V11 1004. Processing can include recording at least 2 corresponding MD updates in the MD log in connection with the deduplication of C1 with respect to W1. The 2 corresponding MD updates can include a first MD update to an IDP field (1002a) of the MD leaf entry E11 (1002b) of MD leaf page L11 1002 such that the IDP field references a VLB entry E12 (1004b) that further includes a pointer or reference (1004c) to the PA1 storing C1 (1005). The VLB entry E12 1004b can be included in the VLB page V11 1004. The 2 corresponding MD updates can include a second MD update to a refcount R11 of the VLB entry E12 of VLB page V11, where the refcount R11 denotes a reference count with respect to PA1 of the corresponding content C1. The first MD update can be performed by recording an IDP tuple 1008 in the MD log. The second MD update can be performed by recording an extended incref tuple 1006 in the MD log.

Figure 11B:
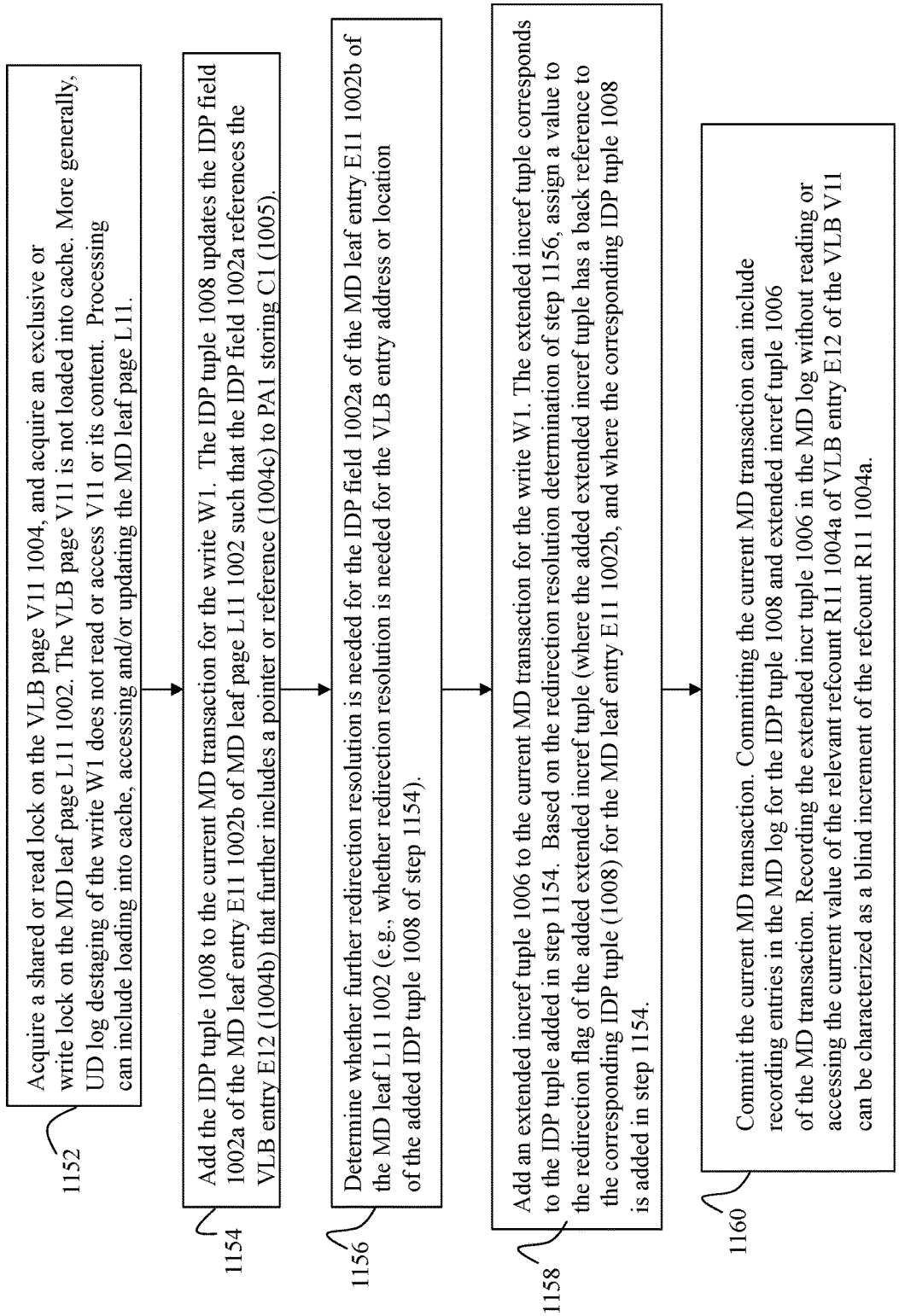

Referring to FIG. 11B, shown is a flowchart 1150 providing more detail of UD log destaging of W1 in at least one embodiment in accordance with the techniques of the present disclosure. In particular, the flowchart 1150 provides further detail of one embodiment of the step 1104 of FIG. 11A.

At the step 1152, processing can include acquiring a shared or read lock on the VLB page V11 1004, and acquiring an exclusive or write lock on the MD leaf page L11 1002. The VLB page V11 is not loaded into cache. More generally, UD log destaging of the write WI does not read or access V11 or its content. Processing of the step 1152 can include loading into cache (as needed), accessing and/or updating the MD leaf page L11. From the step 1152, control proceeds to the step 1154.

At the step 1154, processing is performed to add the IDP tuple 1008 to the current MD transaction for the write W1. The IDP tuple 1008 updates the IDP field 1002a of the MD leaf entry E11 1002b of MD leaf page L11 1002 such that the IDP field 1002a references the VLB entry E12 (1004b) that further includes a pointer or reference (1004c) to PA1 storing C1 (1005). From the step 1154, control proceeds to the step 1156.

At the step 1156, processing determines whether redirection resolution is needed for the IDP field 1002a of the MD leaf entry E11 1002b of the MD leaf L11 1002 (e.g., whether redirection resolution is needed for the VLB entry address or location of the added IDP tuple 1008 of step 1154). From the step 1156, control proceeds to the step 1158.

At the step 1158, processing is performed to add an extended incref tuple 1006 to the current MD transaction for the write W1. The extended incref tuple corresponds to the IDP tuple added in step 1154. Processing of the step 1158 includes assigning a value, in accordance with the step 1156 determination, to the redirection flag of the added extended incref tuple. The added extended incref tuple includes a back reference to the corresponding IDP tuple (1008) for the MD leaf entry E11 1002b, where the corresponding IDP tuple 1008 is added in step 1154. If the step 1154 indicates that redirection resolution is needed, the redirection flag of the extended incref tuple 1006 is set to true (e.g., 1 or on); and otherwise set to false (e.g., 0 or off). From the step 1158, control proceeds to the step 1160.

At the step 1160, processing is performed to commit the MD transaction including the tuples 1006, 1008. Committing the current MD transaction can include recording entries in the MD log for the IDP tuple 1008 and extended incref tuple 1006 of the MD transaction. Consistent with other discussion herein, recording the extended incr tuple 1006 in the MD log without reading or accessing the current value of the relevant refcount R11 1004a of VLB entry E12 of the VLB V11 can be characterized as a blind increment of the refcount R11 1004a.

Figure 12A:
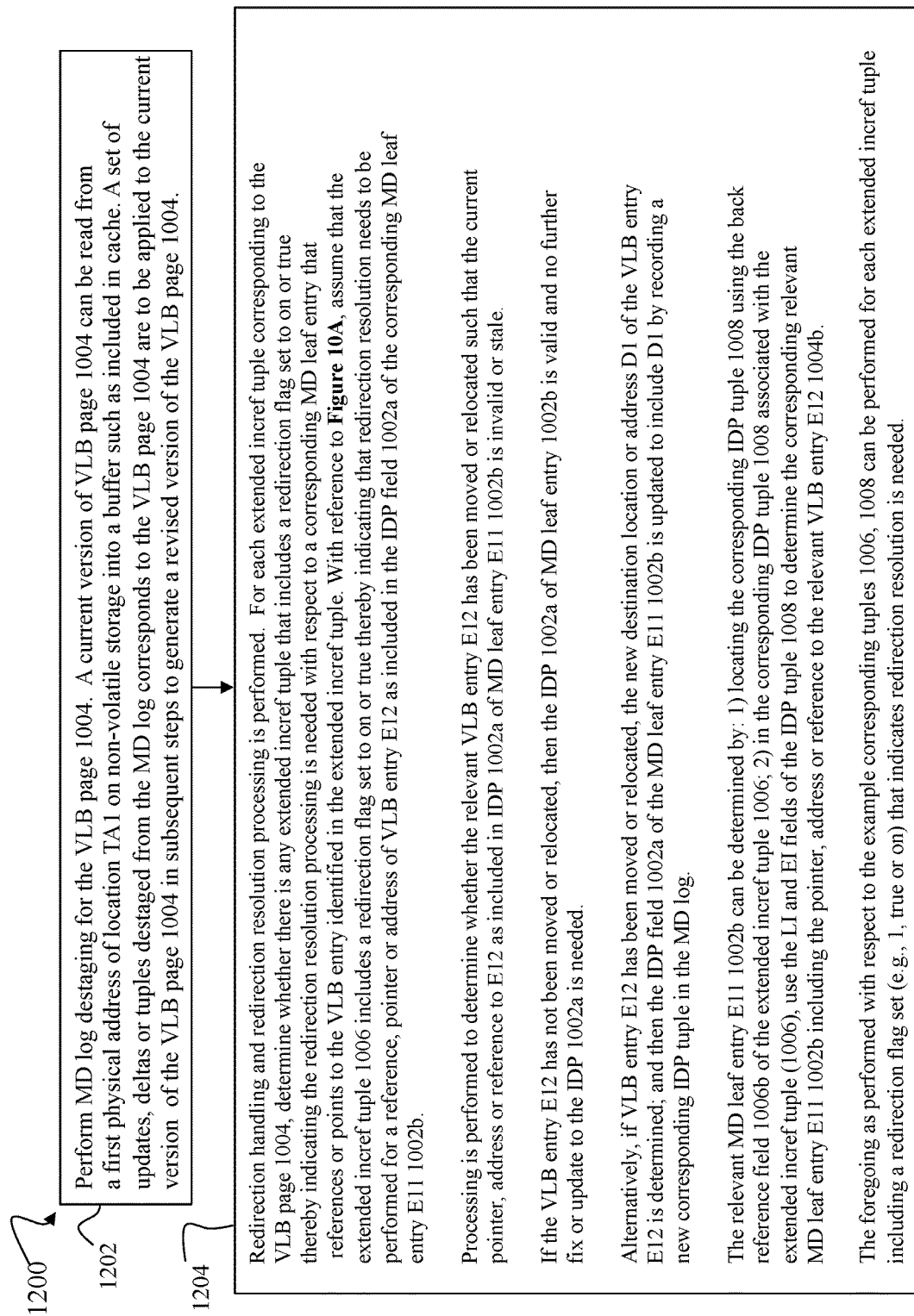
Figure 12B:
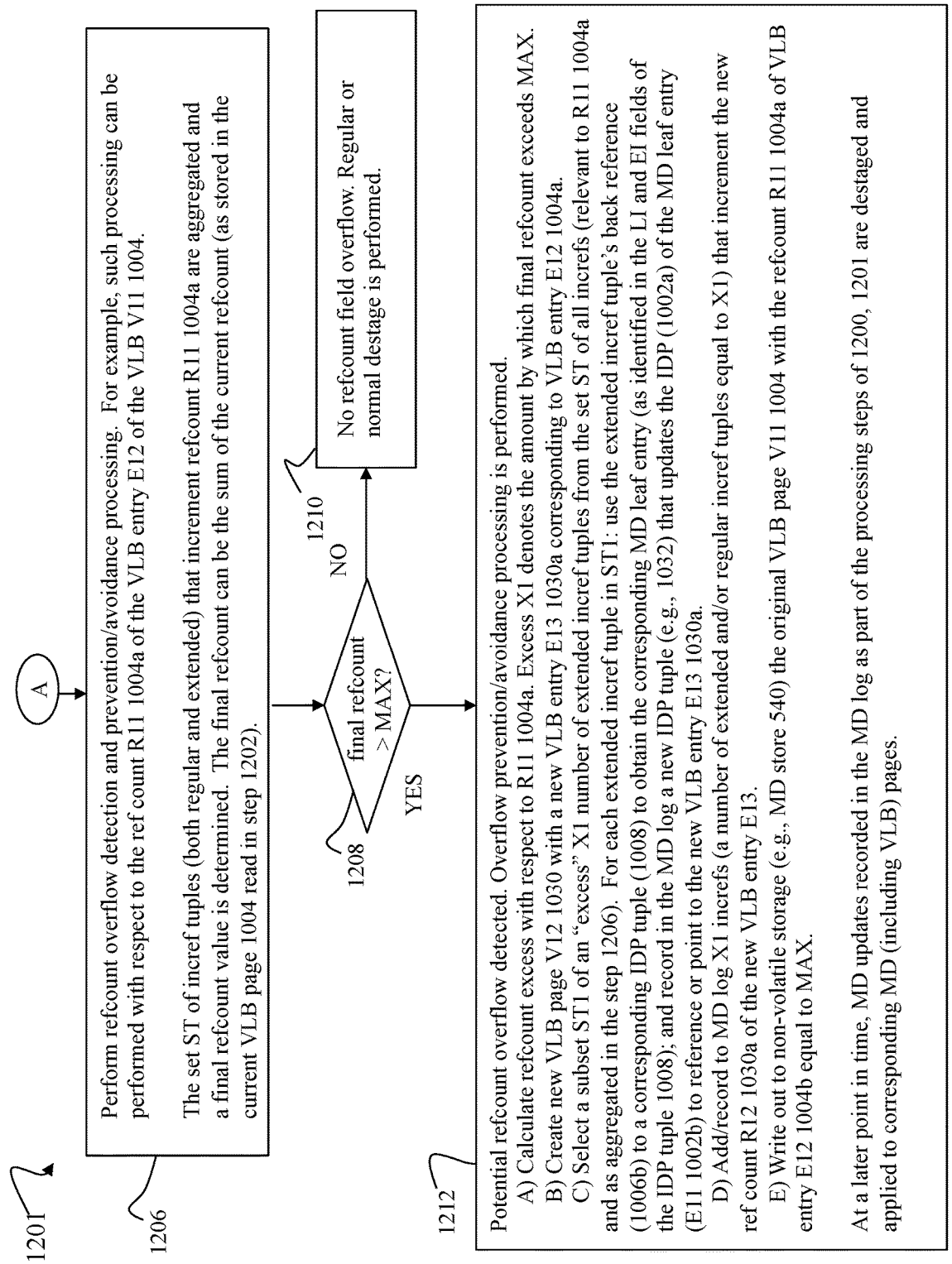

Referring to FIGS. 12A and 12B, shown is a flowchart 1200, 1201 of processing steps that can be performed in connection with MD log destaging in at least one embodiment in accordance with the techniques of the present disclosure. The steps of 1200, 1201 make reference to elements of FIGS. 10A and 10B to further illustrate one example of the processing steps.

At the step 1202, processing includes performing MD log destaging for the VLB page 1004. A current version of VLB page 1004 can be read from a first physical address of location TAI on non-volatile storage into a buffer such as included in cache. A set of updates, deltas or tuples destaged from the MD log corresponds to the VLB page 1004 are to be applied to the current version of the VLB page 1004 in subsequent steps to generate a revised version of the VLB page 1004. From the step 1202, control proceeds to the step 1204.

At the step 1204, redirection handling and redirection resolution processing is performed. For each extended incref tuple corresponding to the VLB page 1004, determine whether there is any extended incref tuple that includes a redirection flag set to on or true thereby indicating the redirection resolution processing is needed with respect to a corresponding MD leaf entry that references or points to the VLB entry identified in the extended incref tuple. With reference to FIG. 10A, assume that the extended incref tuple 1006 includes a redirection flag set to on or true thereby indicating that redirection resolution needs to be performed for a reference, pointer or address of VLB entry E12 as included in the IDP field 1002a of the corresponding MD leaf entry E11 1002b.

In the step 1204, processing is performed to determine whether the relevant VLB entry E12 has been moved or relocated such that the current pointer, address or reference to E12 as included in IDP 1002a of MD leaf entry E11 1002b is invalid or stale. If the VLB entry E12 has not been moved or relocated, then the IDP 1002a of MD leaf entry 1002b is valid and no further fix or update to the IDP 1002a is needed. Alternatively, if VLB entry E12 has been moved or relocated, the new destination location or address DI of the VLB entry E12 is determined; and then the IDP field 1002a of the MD leaf entry E11 1002b is updated to include DI by recording a new corresponding IDP tuple in the MD log. The relevant MD leaf entry E11 1002b can be determined by: 1) locating the corresponding IDP tuple 1008 using the back reference field 1006b of the extended incref tuple 1006; 2) in the corresponding IDP tuple 1008 associated with the extended incref tuple (1006), use the LI and EI fields of the IDP tuple 1008 to determine the corresponding relevant MD leaf entry E11 1002b including the pointer, address or reference to the relevant VLB entry E12 1004b.

The foregoing as performed with respect to the example corresponding tuples 1006, 1008 can be performed for each extended incref tuple including a redirection flag set (e.g., 1, true or on) that indicates redirection resolution is needed. From the step 1204, control proceeds to the step 1206.

At the step 1206, refcount overflow detection and prevention/avoidance processing is performed. For example, such processing can be performed with respect to the ref count R11 1004a of the VLB entry E12 of the VLB V11 1004. The set ST of incref tuples (both regular and extended) that increment refcount R11 1004a are aggregated and a final refcount value is determined. The final refcount can be the sum of the current refcount (as stored in the current VLB page 1004 read in step 1202). From the step 1206, control proceeds to the step 1208.

At the step 1208, a determination is made as to whether the final refcount is greater than MAX. If the step 1208 evaluates to no, control proceeds to the step 1210. At the step 1210, regular or normal destage processing can continue since no refcount field overflow is detected. Such regular or normal destage processing can include, for example, persistently storing the final refcount as the revised value of the refcount R11 1004a in the VLB page 1004. It should be noted that depending on embodiment, there may be other relevant tuples that affect and can further modify the updated refcount as persisted.

If the step 1208 evaluates to yes, control proceeds to the step 1212. At the step 1212, a potential overflow of the refcount R11 1004a has been detected such that if the overflow prevention and avoidance processing described herein is not performed and the final refcount is otherwise persistently stored to the refcount field R11 1004a of the VLB page 1004, then an overflow condition of R11 1004a will occur. In the step 1212, overflow prevention or avoidance processing can include:

A) Calculating refcount excess with respect to R11 1004a. Excess X1 denotes the amount by which final refcount exceeds MAX.
B) Creating new VLB page V12 1030 with a new VLB entry E13 1030a corresponding to VLB entry E12 1004a.
C) Selecting a subset STI of an "excess" X1 number of extended incref tuples from the set ST of all increfs (relevant to R11 1004a and as aggregated in the step

1206). For each extended incref tuple in STI: use the extended incref tuple's back reference (1006*b*) to a corresponding IDP tuple (1008) to obtain the corresponding MD leaf entry (as identified in the LI and EI fields of the IDP tuple 1008); and record in the MD log a new IDP tuple (e.g., 1032) that updates the IDP (1002*a*) of the MD leaf entry (E11 1002*b*) to reference or point to the new VLB entry E13 1030*a*.

D) Adding to MD log X1 increfs (a number of extended and/or regular incref tuples equal to X1) that increment the new ref count R12 1030*a* of the new VLB entry E13.

E) Writing out to non-volatile storage (e.g., MD store 540) the original VLB page V11 1004 with the refcount R11 1004*a* of VLB entry E12 1004*b* equal to MAX.

At a later point in time, MD updates recorded in the MD log as part of the processing steps of 1200, 1201 are destaged and applied to corresponding MD (including VLB) pages.

In at least one embodiment, operations of C), D) and E) of the step 1212 can be performed as a single MD commit or transaction such that all operations thereof are performed, or none are performed. In at least one embodiment, step E) can be performed out of the single MD commit or transaction in which case a decref tuple to decrement the refcount R11 1004*a* by the excess amount X1 can be added to the MD transaction for consistency in case of an occurrence of an event causing the system to go offline or fail and then reboot and perform recovery processing.

In at least one embodiment, the processing of FIGS. 12A and 12B includes processing performed for a corrective action taken in response to detecting a potential refcount overflow condition to prevent the occurrence of the refcount overflow. The corrective action can be characterized as providing for dynamic or inflight rerouting of excessive references to a VLB entry including a refcount and further pointer, address or reference to a content stored on non-volatile storage, where the refcount denotes a number of references such as by logical addresses and corresponding MD leaf entries to the VLB entry and stored content.

In at least one embodiment, B) of the step 1212 can include updating a field of the new VLB entry E13 1030*a* to reference or point to an instance of the written content C1 as stored on non-volatile storage. In at least one embodiment, the new VLB entry E13 1030*a* can be PA1. Alternatively in at least one embodiment, the new VLB entry E13 1030*a* can be a second physical address or location PA2 on non-volatile storage where PA2 includes another instance or copy of C1.

In at least one embodiment, once a VLB and/or PLB (physical large block) of BE non-volatile storage) is allocated in the context of MD log destaging, such VLB and PLB can be used for further writes until full or otherwise meeting any specified consumption limit. In at least one embodiment, the PLB can be used to store content written by writes. In this manner in such an embodiment, there may be one active PLB and VLB per node for use in connection with MD log destage. In at least one embodiment, content being written to a PLB of non-volatile BE storage can be cached, updated and/or appended in NVRAM and then written out to non-volatile BE storage.

In at least one embodiment, the processing of FIGS. 12A-12B can be performed in a first MD log destage cycle. A subsequent second MD log destage cycle can include destaging from the MD log the new IDP tuple (e.g., as written in C) of step 1212) and the second number of increment reference tuples (e.g., as written or recorded in the MD log in D) of step 1212). Consistent with other discussion herein in at least one embodiment, a frozen instance of the in-memory MD log (e.g., frozen HBSB) can be destaged during the first MD log destage cycle. Additionally in at least one embodiment, the new IDP tuple of step 1212 C) and the second number of increment tuples of step 1212 D) can be recorded or added to an active instance of the in-memory MD log (e.g., active HBSB) during the first MD log destage cycle. After the first MD log destage cycle, the particular instance of the MD log that is active transitions to frozen and is now destaged in the second MD log destage cycle.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a write operation that writes first content to a first target logical address;
recording the write operation in a user data (UD) log;
destaging the write operation from the UD log including:
performing deduplication processing that determines the first content written by the write operation is a duplicate of the first content as currently stored at a first physical address on non-volatile storage; and
establishing mapping information of a chain of metadata (MD) pages that maps the first target logical address to the first physical address of the first content, wherein the chain of MD pages includes a MD leaf page and a VLB (virtual layer block) page, and wherein said establishing includes:
recording in a MD log two corresponding updates in connection with deduplication of the first content, the two corresponding updates including a first update and a second update, wherein the first update updates an indirect pointer (IDP) field of a first MD leaf entry of the MD leaf page to reference a first VLB entry of the VLB page where the first VLB entry further includes the first physical address of the first content, and wherein the second update increments a reference count of the first VLB entry, wherein said recording includes recording the second update in the MD log without reading or accessing a current value of the reference count of the first VLB entry during said destaging the write operation from the UD log, where the reference count of the first VLB entry denotes a number of logical addresses that reference the first content as stored at the first physical address, wherein the first update of the MD log is an IDP tuple that identifies the first MD leaf entry, and identifies a first address or location of the first VLB entry, wherein the second update of the MD log is an extended increment reference count (incref) tuple that identifies the first VLB entry including the reference count, and includes a back reference to the IDP tuple denoting the first update, and wherein said destaging the write operation includes:
acquiring a shared or read lock on the first VLB page and acquiring an exclusive or write lock on the MD leaf page;
adding the IDP tuple to a current MD transaction;
adding the extended incref tuple to the current MD transaction; and
committing the current MD transaction to the MD log, wherein said committing includes transactionally storing the IDP tuple and the extended incref tuple for the write operation in the MD log.

2. The computer-implemented method of claim 1, wherein the extended incref tuple includes a redirection flag indicating whether redirection resolution is needed for the IDP field of the first MD leaf entry to determine whether a first current value of the IDP field denotes a valid address or location of the first VLB entry.

3. The computer-implemented method of claim 2, wherein said destaging the write operation includes:
determining whether redirection resolution of the IDP field of the first MD leaf entry is needed; and
responsive to determining redirection resolution of the IDP field of the first MD leaf entry is needed setting the redirection flag of the extended incref tuple to true, and otherwise setting the redirection flag of the extended incref tuple to false.

4. The computer-implemented method of claim 2, further comprising performing MD log destaging of recorded updates to the first VLB page including:
aggregating a first set(S) of relevant increment tuples from the MD log that increment the reference count of the first VLB entry, wherein S includes the extended incref tuple;
calculating an updated value for the reference count by incrementing a current value of the reference count in accordance with a number of increments denoted by the relevant increment tuples of S; and
determining whether the updated value exceeds a maximum allowable value (MAX) for the reference count.

5. The computer-implemented method of claim 4, wherein said MD log destaging of recorded updates to the first VLB page includes:
responsive to determining that the updated value does exceed MAX, performing first processing including:
calculating an excess value with respect to the updated value of the reference count, wherein the excess value denotes an amount by which the updated value exceeds MAX;
creating a second VLB page including a second VLB entry corresponding to the first VLB entry of the first VLB page; and
selecting a first number of increment tuples from S, wherein the first number equals the excess value, wherein the first number of increment tuples selected includes the extended incref tuple.

6. The computer-implemented method of claim 5, wherein the first processing includes:
identifying, using the back reference of the extended incref tuple, the first MD leaf entry; and
recording in the MD log a second IDP tuple that updates the IDP of the first MD leaf entry to reference or point to the second VLB entry of the second VLB.

7. The computer-implemented method of claim 6, wherein said first processing further includes:
recording in the MD log a second number of increment reference tuples each incrementing a second reference count of the second VLB entry, wherein the second number equals the excess value.

8. The computer-implemented method of claim 7, wherein the second number of increment reference tuples includes one or more extended incref tuples incrementing the second reference count of the second VLB entry.

9. The computer-implemented method of claim 7, wherein the second number of increment reference tuples includes one or more non-extended incref tuples incrementing the second reference count of the second VLB entry.

10. The computer-implemented method of claim 9, wherein each of the non-extended incref tuples does not include a back reference to a corresponding IDP tuple, and wherein each of the non-extended incref tuples does not include a redirection flag field.

11. The computer-implemented method of claim 10, wherein said first processing includes:
persistently storing MAX as a value for the reference count of the first VLB entry.

12. The computer-implemented method of claim 7, wherein said MD log destaging of recorded updates to the first VLB page is included in a first MD log destage cycle, and the method includes performing a second MD log destage cycle that includes destaging from the MD log the second IDP tuple and the second number of increment reference tuples.

13. The computer-implemented method of claim 12, wherein during the first MD log destage cycle, the MID log that is destaged is a first in-memory MD log instance that is in a frozen state;
wherein during the first MD log destage cycle, a second in-memory MD log instance is in an active state, and the second IDP tuple and the second number of increment reference tuples are recorded in the second in-memory MD log instance during the first MD log destage cycle; and
wherein during the second MD log destage cycle, the second in-memory MD log instance is in the frozen state and the first in-memory MD log instance is in the active state.

14. The computer-implemented method of claim 4, wherein said MD log destaging of recorded updates to the first VLB page includes:
determining whether the redirection flag of the extended incref tuple is true;
responsive to determining that the redirection flag of the extended incref tuple is true, performing second processing including:
determining whether the first current value of the IDP field of the first MD leaf entry is invalid because the first VLB entry has been moved or relocated such that the first current value of the IDP field denotes an old prior address or location of the first VLB entry prior to being relocated or moved; and
responsive to determining the first current value of the IDP field of the first MD leaf is invalid, updating the IDP field of the first MD leaf entry by recording in the MD log a second corresponding IDP tuple that updates the IDP field of the first MD leaf entry to a current valid address or location of the first VLB entry.

15. The computer-implemented method of claim 5, wherein the second VLB entry includes either the first physical address of the first content or a second physical address of a copy of the first content as stored on non-volatile storage.

16. A system comprising:
one or more processors; and
a memory comprising code stored thereon that, when executed, performs a method comprising:
receiving a write operation that writes first content to a first target logical address;
recording the write operation in a user data (UD) log;
destaging the write operation from the UD log including:
performing deduplication processing that determines the first content written by the write operation is a duplicate of the first content as currently stored at a first physical address on non-volatile storage; and
establishing mapping information of a chain of metadata (MD) pages that maps the first target logical address to the first physical address of the first content, wherein the chain of MD pages includes a MD leaf page and a VLB (virtual layer block) page, and wherein said establishing includes:
recording in a MD log two corresponding updates in connection with deduplication of the first content, the two corresponding updates including a first update and a second update, wherein the first update updates an indirect pointer (IDP) field of a first MD leaf entry of the MD leaf page to reference a first VLB entry of the VLB page where the first VLB entry further includes the first physical address of the first content, and wherein the second update increments a reference count of the first VLB entry, wherein said recording includes recording the second update in the MD log without reading or accessing a current value of the reference count of the first VLB entry during said destaging the write operation from the UD log, where the reference count of the first VLB entry denotes a number of logical addresses that reference the first content as stored at the first physical address, wherein the first update of the MD log is an IDP tuple that identifies the first MD leaf entry, and identifies a first address or location of the first VLB entry, wherein the second update of the MD log is an extended increment reference count (incref) tuple that identifies the first VLB entry including the reference count, and includes a back reference to the IDP tuple denoting the first update, and wherein said destaging the write operation includes:
acquiring a shared or read lock on the first VLB page and acquiring an exclusive or write lock on the MD leaf page;
adding the IDP tuple to a current MD transaction;
adding the extended incref tuple to the current MD transaction; and
committing the current MD transaction to the MD log, wherein said committing includes transactionally storing the IDP tuple and the extended incref tuple for the write operation in the MD log.

17. A non-transitory computer readable medium comprising code stored thereon that, when executed, performs a method comprising:
receiving a write operation that writes first content to a first target logical address;
recording the write operation in a user data (UD) log;
destaging the write operation from the UD log including:
performing deduplication processing that determines the first content written by the write operation is a duplicate of the first content as currently stored at a first physical address on non-volatile storage; and
establishing mapping information of a chain of metadata (MD) pages that maps the first target logical address to the first physical address of the first content, wherein the chain of MD pages includes a MD leaf page and a VLB (virtual layer block) page, and wherein said establishing includes:
recording in a MD log two corresponding updates in connection with deduplication of the first content, the two corresponding updates including a first update and a second update, wherein the first update updates an indirect pointer (IDP) field of a first MD leaf entry of the MD leaf page to reference a first VLB entry of the VLB page where the first VLB entry further includes the first physical address of the first content, and wherein the second update increments a reference count of the first VLB entry, wherein said recording includes recording the second update in the MD log without reading or accessing a current value of the reference count of the first VLB entry during said destaging the write operation from the UD log, where the reference count of the first VLB entry denotes a number of logical addresses that reference the first content as stored at the first physical address, wherein the first update of the MD log is an IDP tuple that identifies the first MD leaf entry, and identifies a first address or location of the first VLB entry, wherein the second update of the MD log is an extended increment reference count (incref) tuple that identifies the first VLB entry including the reference count, and includes a back reference to the IDP tuple denoting the first update, and wherein said destaging the write operation includes:
acquiring a shared or read lock on the first VLB page and acquiring an exclusive or write lock on the MD leaf page;
adding the IDP tuple to a current MD transaction;
adding the extended incref tuple to the current MD transaction; and
committing the current MD transaction to the MD log, wherein said committing includes transactionally storing the IDP tuple and the extended incref tuple for the write operation in the MD log.

* * * * *